(12) United States Patent
Heinonen et al.

(10) Patent No.: US 7,555,287 B1
(45) Date of Patent: Jun. 30, 2009

(54) CUSTOMIZED MESSAGING BETWEEN WIRELESS ACCESS POINT AND SERVICES

(75) Inventors: Tomi Heinonen, Tampere (FI); Timo M. Laitinen, Tampere (FI)

(73) Assignee: Nokia Corporation, Espoo (FI)

( * ) Notice: Subject to any disclaimer, the term of this patent is extended or adjusted under 35 U.S.C. 154(b) by 889 days.

(21) Appl. No.: 09/985,044

(22) Filed: Nov. 1, 2001

(51) Int. Cl.
*H04M 1/725* (2006.01)

(52) U.S. Cl. .............. 455/412.1; 455/456.2; 455/456.3; 455/456.5; 455/456.6; 455/41.2

(58) Field of Classification Search .............. 455/414.3, 455/556.2, 456.5, 412.1, 412.2
See application file for complete search history.

(56) References Cited

U.S. PATENT DOCUMENTS

| | | | |
|---|---|---|---|
| 5,606,617 A | 2/1997 | Brands | |
| 5,668,878 A | 9/1997 | Brands | |
| 5,696,827 A | 12/1997 | Brands | |
| 5,749,081 A | 5/1998 | Whiteis | |
| 5,835,061 A * | 11/1998 | Stewart | 342/457 |

(Continued)

FOREIGN PATENT DOCUMENTS

AU        200135071        10/2001

(Continued)

OTHER PUBLICATIONS

Peddemors et al. "Combining Presence, Location and Instant Messaging In A Context-Aware Mobile Application Framework", GigaMobile/D2.8, Telematica Instituut, Mar. 20, 2002, pp. 3-13.

(Continued)

*Primary Examiner*—Simon Sing
(74) *Attorney, Agent, or Firm*—Ditthavong Mori & Steiner, P.C.

(57) ABSTRACT

A method is disclosed for facilitating the preparation of customized messaging between a wireless access point and a variety of service platforms. The wireless access point includes a registry of trigger words, each word specifying the particular events that must be detected by the access point upon receiving a packet from a mobile wireless device, in order to invoke the process of sending a corresponding server message to a selected server. When the wireless packet is received by the access point, the access point uses the various types of information in the received packet as stimuli to be matched with the trigger words stored in the trigger word registry. If there is a match, then a customized message corresponding to the matched trigger word is accessed from a customized message registry and sent to the server specified in the message. The server uses this information for an appropriate query of its database to access the content. The content is then used for a particular application or returned to the access point for communication to the mobile device. The wireless access point includes management software to present to the system administrator on a connected personal computer, a management menu of example trigger words and example server messages. The management software provides an editor to enable the administrator to optionally customize the example trigger words and/or server messages to suit particular applications.

42 Claims, 21 Drawing Sheets

U.S. PATENT DOCUMENTS

| | | | |
|---|---|---|---|
| 5,903,832 A | 5/1999 | Seppanen et al. | |
| 5,987,099 A | 11/1999 | O'Neill et al. | |
| 6,006,200 A | 12/1999 | Boies et al. | |
| 6,023,241 A | 2/2000 | Clapper | |
| 6,041,311 A | 3/2000 | Chislenko et al. | |
| 6,044,062 A | 3/2000 | Brownrigg et al. | |
| 6,049,777 A | 4/2000 | Sheena et al. | |
| 6,052,467 A | 4/2000 | Brands | |
| 6,055,227 A * | 4/2000 | Lennert et al. | 370/254 |
| 6,064,980 A | 5/2000 | Jacobi et al. | |
| 6,065,012 A | 5/2000 | Balsara et al. | |
| 6,092,049 A | 7/2000 | Chislenko et al. | |
| 6,108,493 A | 8/2000 | Miller et al. | |
| 6,119,101 A | 9/2000 | Peckover | |
| 6,134,445 A | 10/2000 | Gould et al. | |
| 6,138,158 A | 10/2000 | Boyle et al. | |
| 6,138,159 A | 10/2000 | Phaal | |
| 6,167,278 A | 12/2000 | Nilssen | |
| 6,182,050 B1 | 1/2001 | Ballard | |
| 6,195,651 B1 | 2/2001 | Handel et al. | |
| 6,195,657 B1 | 2/2001 | Rucker et al. | |
| 6,199,099 B1 | 3/2001 | Gershman et al. | |
| 6,205,472 B1 | 3/2001 | Gilmour | |
| 6,225,997 B1 | 5/2001 | Mitsuoka et al. | |
| 6,236,768 B1 | 5/2001 | Rhodes et al. | |
| 6,243,581 B1 | 6/2001 | Jawanda | |
| 6,253,202 B1 | 6/2001 | Gilmour | |
| 6,253,203 B1 | 6/2001 | O'Flaherty et al. | |
| 6,255,800 B1 | 7/2001 | Bork | |
| 6,263,447 B1 | 7/2001 | French et al. | |
| 6,275,824 B1 | 8/2001 | O'Flaherty et al. | |
| 6,285,879 B1 | 9/2001 | Lechner et al. | |
| 6,317,781 B1 | 11/2001 | De Boor et al. | |
| 6,321,257 B1 | 11/2001 | Kotola et al. | |
| 6,330,448 B1 | 12/2001 | Otsuka et al. | |
| 6,389,284 B1 * | 5/2002 | Cook et al. | 455/434 |
| 6,414,955 B1 | 7/2002 | Clare et al. | |
| 6,421,707 B1 | 7/2002 | Miller et al. | |
| 6,430,395 B2 | 8/2002 | Arazi et al. | |
| 6,430,413 B1 | 8/2002 | Wedi et al. | |
| 6,438,585 B2 | 8/2002 | Mousseau et al. | |
| 6,445,921 B1 | 9/2002 | Bell | |
| 6,477,373 B1 | 11/2002 | Rappaport et al. | |
| 6,493,550 B1 | 12/2002 | Raith | |
| 6,510,381 B2 | 1/2003 | Grounds et al. | |
| 6,515,974 B1 | 2/2003 | Inoue et al. | |
| 6,519,453 B1 | 2/2003 | Hamada et al. | |
| 6,527,641 B1 | 3/2003 | Sinclair et al. | |
| 6,539,225 B1 | 3/2003 | Lee | |
| 6,542,740 B1 | 4/2003 | Olgaard et al. | |
| 6,546,263 B1 | 4/2003 | Petty et al. | |
| 6,549,625 B1 | 4/2003 | Rautila et al. | |
| 6,554,707 B1 | 4/2003 | Sinclair et al. | |
| 6,580,698 B1 | 6/2003 | Nitta | |
| 6,601,093 B1 | 7/2003 | Peters | |
| 6,604,140 B1 | 8/2003 | Beck et al. | |
| 6,674,403 B2 * | 1/2004 | Gray et al. | 342/463 |
| 6,678,516 B2 * | 1/2004 | Nordman et al. | 455/414.1 |
| 6,680,919 B1 | 1/2004 | Rauhala | |
| 6,714,519 B2 | 3/2004 | Luzzatti et al. | |
| 6,721,542 B1 | 4/2004 | Anttila et al. | |
| 6,862,276 B1 | 3/2005 | Abrol et al. | |
| 6,862,594 B1 | 3/2005 | Saulpaugh et al. | |
| 6,909,903 B2 * | 6/2005 | Wang | 455/456.1 |
| 6,917,960 B1 | 7/2005 | Decasper et al. | |
| 6,975,850 B1 * | 12/2005 | Hurtta et al. | 455/405 |
| 2001/0007820 A1 | 7/2001 | Do et al. | |
| 2001/0021649 A1 | 9/2001 | Kinnunen et al. | |
| 2001/0029166 A1 | 10/2001 | Rune et al. | |
| 2001/0034223 A1 | 10/2001 | Rieser et al. | |
| 2001/0039546 A1 | 11/2001 | Moore et al. | |
| 2002/0006788 A1 * | 1/2002 | Knutsson et al. | 455/422 |
| 2002/0013815 A1 | 1/2002 | Obradovich et al. | |
| 2002/0015042 A1 | 2/2002 | Robotham et al. | |
| 2002/0019882 A1 | 2/2002 | Soejima et al. | |
| 2002/0052873 A1 | 5/2002 | Delgado et al. | |
| 2002/0061741 A1 | 5/2002 | Leung et al. | |
| 2002/0065881 A1 | 5/2002 | Mansikkaniemi et al. | |
| 2002/0083025 A1 | 6/2002 | Robarts et al. | |
| 2002/0083121 A1 | 6/2002 | Chang et al. | |
| 2002/0094778 A1 | 7/2002 | Cannon et al. | |
| 2002/0116458 A1 | 8/2002 | Bricklin et al. | |
| 2002/0126872 A1 | 9/2002 | Brunk et al. | |
| 2002/0156795 A1 | 10/2002 | Edwards et al. | |
| 2002/0158917 A1 | 10/2002 | Sinclair et al. | |
| 2002/0164963 A1 * | 11/2002 | Tehrani et al. | 455/101 |
| 2002/0173877 A1 | 11/2002 | Zweig | |
| 2002/0178211 A1 | 11/2002 | Singhal et al. | |
| 2002/0191017 A1 | 12/2002 | Sinclair et al. | |
| 2002/0193073 A1 | 12/2002 | Fujioka | |
| 2002/0198882 A1 | 12/2002 | Linden et al. | |
| 2003/0013459 A1 | 1/2003 | Rankin et al. | |
| 2003/0036350 A1 | 2/2003 | Jonsson et al. | |
| 2003/0115038 A1 | 6/2003 | Want et al. | |
| 2003/0119446 A1 | 6/2003 | Fano et al. | |
| 2003/0119494 A1 | 6/2003 | Alanara et al. | |
| 2003/0140246 A1 | 7/2003 | Kammer et al. | |
| 2003/0149823 A1 | 8/2003 | Newman et al. | |
| 2003/0171147 A1 | 9/2003 | Sinclair et al. | |
| 2003/0177113 A1 | 9/2003 | Wakita | |
| 2003/0208536 A9 | 11/2003 | Lee et al. | |
| 2003/0208595 A1 | 11/2003 | Gouge et al. | |
| 2004/0073793 A1 | 4/2004 | Takeda | |
| 2004/0171379 A1 | 9/2004 | Cabrera et al. | |
| 2004/0190529 A1 | 9/2004 | Hara | |
| 2004/0202132 A1 | 10/2004 | Heinonen et al. | |
| 2005/0169214 A1 | 8/2005 | Suomela | |
| 2005/0260996 A1 | 11/2005 | Groenendaal | |
| 2005/0277418 A1 | 12/2005 | Singhal et al. | |
| 2006/0170967 A1 | 8/2006 | Maki et al. | |
| 2006/0173781 A1 | 8/2006 | Donner | |

FOREIGN PATENT DOCUMENTS

| | | |
|---|---|---|
| DE | 198 14 162 A1 | 10/1999 |
| EP | 0 944 176 | 9/1999 |
| EP | 1 107 512 A | 6/2001 |
| EP | 1 72 991 A1 | 1/2002 |
| EP | 1217792 | 6/2002 |
| EP | 1282289 | 2/2003 |
| WO | WO 97/10547 A | 3/1997 |
| WO | WO 99/20060 A | 4/1999 |
| WO | WO 99/66428 | 12/1999 |
| WO | WO 00/11563 | 3/2000 |
| WO | WO 00/11793 | 3/2000 |
| WO | WO 00/67435 A | 11/2000 |
| WO | WO 01/33797 A | 5/2001 |
| WO | WO 01/35253 | 5/2001 |
| WO | WO 01/35269 | 5/2001 |
| WO | WO 01/46826 | 6/2001 |
| WO | WO 01/50299 | 7/2001 |
| WO | WO 01/69864 A2 | 9/2001 |
| WO | WO 01/97433 A2 | 12/2001 |
| WO | WO 02/03626 | 1/2002 |
| WO | WO 03/017592 | 2/2003 |
| WO | WO 03/088578 A1 | 10/2003 |
| WO | WO 2004/004372 | 1/2004 |

OTHER PUBLICATIONS

Bisdikian et al. "Quests In A Tetherless World", Wireless Communications and Mobile Computing 2002; 2:449-464, John Wiley & Sons, Ltd., 2002, pp. 449-464.

"How to Inquire About Services On a Remote Device", web page [online], Symbian Ltd, 2002 [1 page retrieved on Dec. 31, 2003].

Retrieved from the Internet: <http://www.symbian.com/developer/techlib/v70docs/SDL v7.0/doc source/DevGuides/cpp/..>.
U.S. Appl. No. 09/854,635, filed May 15, 2001, Kaita et al.
U.S. Appl. No. 09/950,773, filed Sep. 13, 2001, Kaita et al.
U.S. Appl. No. 10/101,688, filed Mar. 21, 2002, Aholainen et al.
U.S. Appl. No. 10/073,200, filed Feb. 13, 2002, Hamberg.
U.S. Appl. No. 10/389,624, filed Mar. 13, 2003, Jung et al.
U.S. Appl. No. 10/786,705, filed Feb. 24, 2004, Jung et al.
U.S. Appl. No. 10/954,197, filed Oct. 1, 2004, Malinen et al.
Bluetooth Specification, "Bluetooth Assigned Numbers, Appendix VIII", Version 1.0B, Nov. 29, 1999, pp. 1010-1032.
U.S. Appl. No. 09/406,596, filed Sep. 24, 1999, Schulz et al.
U.S. Appl. No. 10/504,410, filed Aug. 13, 2004, Hamberg.
Service Notification on a Low Bluetooth Layer, filed Nov. 1, 2001, Heinonen et al.
Local Service Handover, filed Nov. 1, 2001, Heinonen et al.
Fomer, "A Multi-Agent Referral System for Matchmaking", MIT Media Lab, Apr. 22, 1996, pp. 245-261.
http://www.commerce.usask.ca/faculity/linksE_commerce/lovegety.htm, Aug. 13, 2003, 2 pp.
http://www.genesconnected.co.uk, Aug. 13, 2003, 1 pp.
http://www.amazon.com/exec/obidos/subst/home/home.html/02202250..., Aug. 13, 2003, 4 pp.
http://www.ebay.com, Aug. 13, 2003, 2 pp.
Chinese Office Action dated Feb. 16, 2007.

* cited by examiner

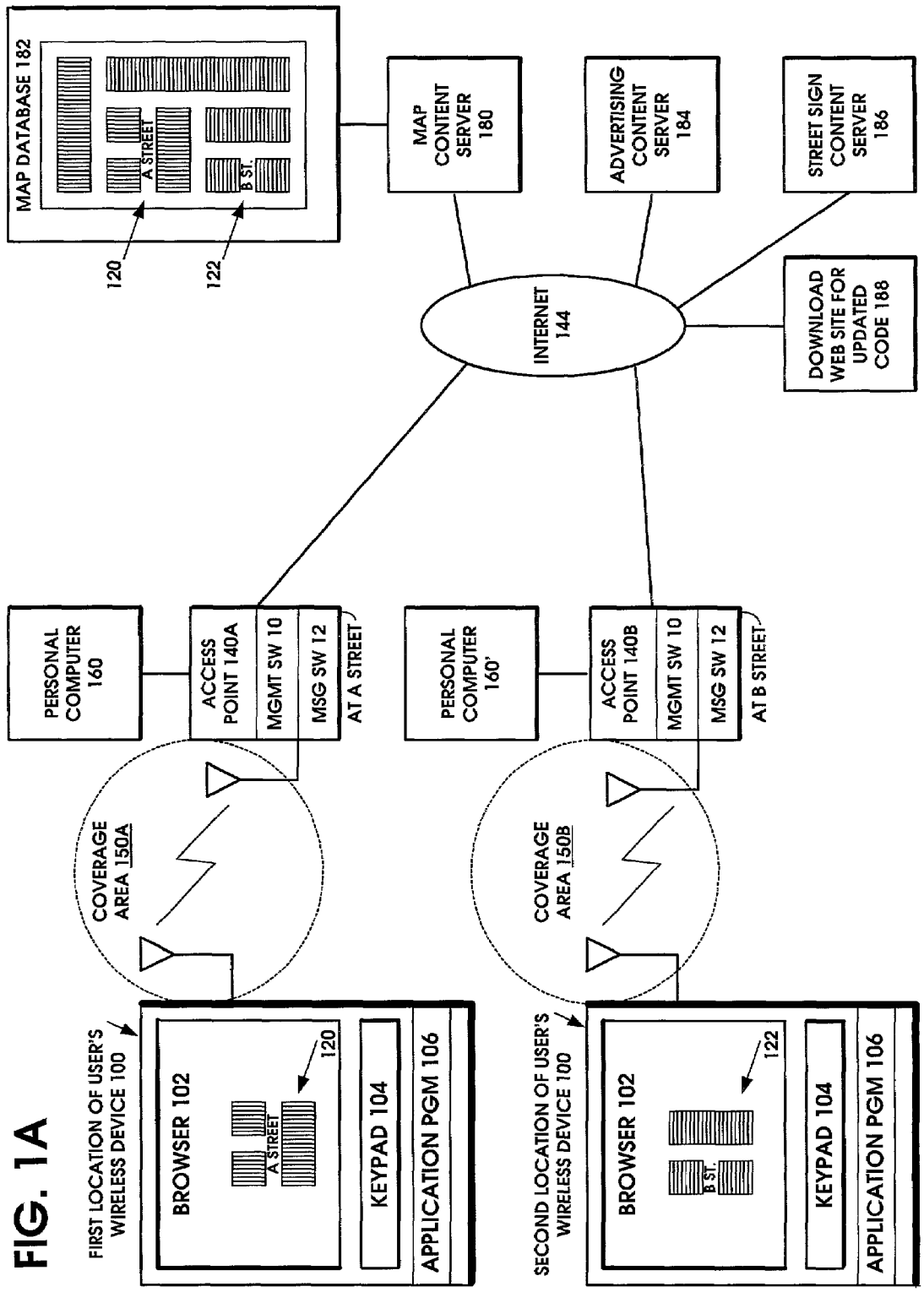

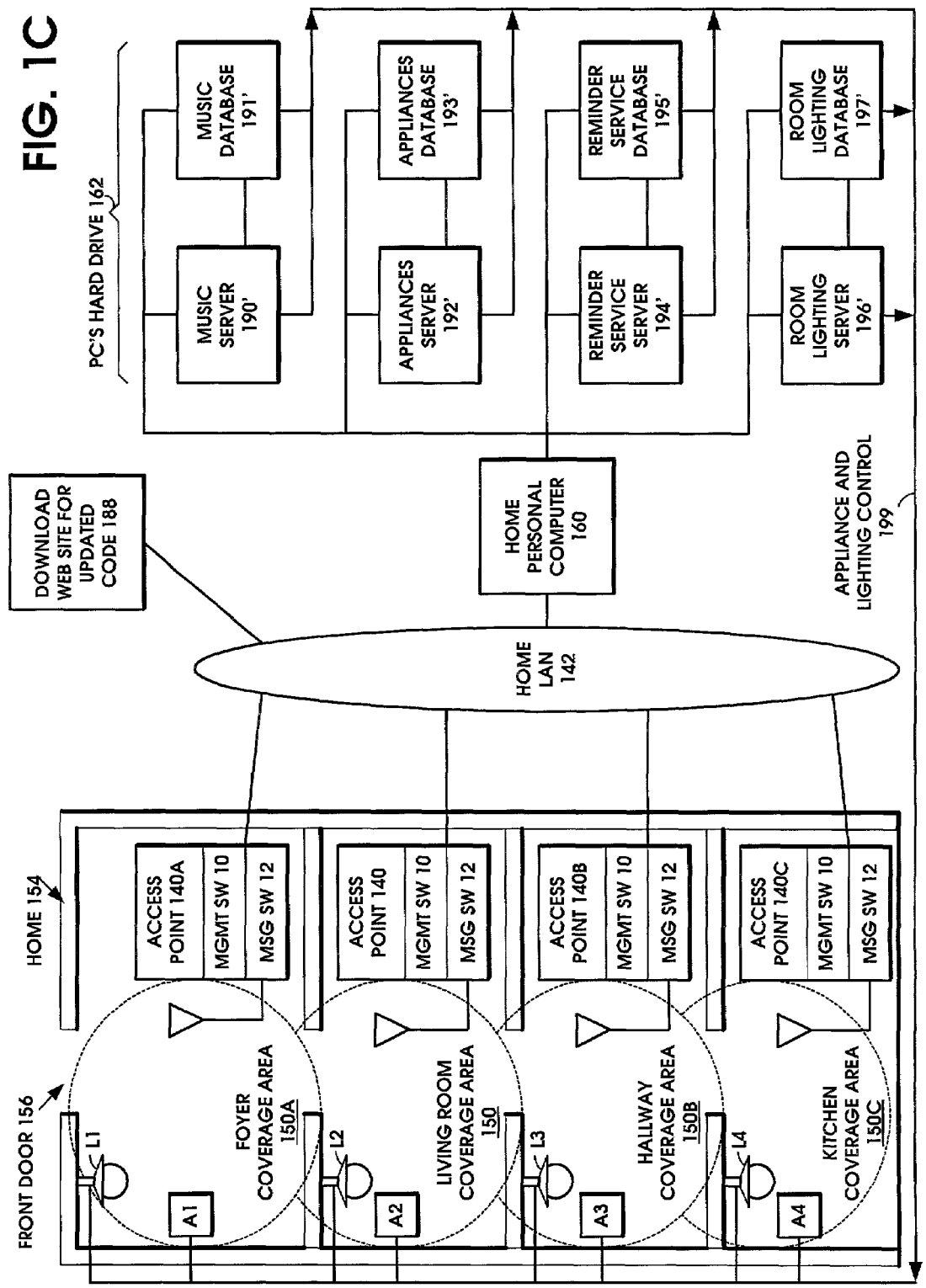

FIG. 2C

EXAMPLE TRIGGER WORDS 110 → MANAGEMENT SOFTWARE 10

| TRIGGER WORD NUMBER 262 | TRIGGER SIGNAL TYPE 264 | ADDRESS DEVICE_ ADDR 266 | CLASS OF DEVICE VALUE 268 | OTHER 274 |
|---|---|---|---|---|
| 0001 | INQ/PAGE | ANY | ANY | NONE |
| 0002 | INQ/PAGE | ANY | ANY | NONE |
| 0003 | INQ/PAGE | ANY | ANY | NIGHT |
| 0004 | INQ/PAGE | ANY | ANY | NONE |
| 0005 | INQ/PAGE | ANY | ANY | NONE |

FIG. 2D

EXAMPLE SERVER MESSAGES 112 → MANAGEMENT SOFTWARE 10

| CUSTOM MESSAGE NUMBER 282 | TRIGGER WORD NUMBER 262' | ADDRESS DEVICE_ ADDR 284 | CLASS OF DEVICE 286 | GEO COORD 288 | SERVER PATH NAME 292 | SERVER URL 294 | ACCESS POINT AP_ADDR 290 |
|---|---|---|---|---|---|---|---|
| 0001 | 0001 | YES | NO | LAT/LON | C:\TCARD | AD_*** | AP_140A |
| 0002 | 0002 | NO | NO | LAT/LON | C:\LIGHTS | AD_*** | AP_140A |
| 0003 | 0003 | YES | NO | LAT/LON | C:\SECURE | AD_*** | AP_140A |
| 0004 | 0004 | YES | NO | LAT/LON | C:\MUSIC | AD_*** | AP_140A |
| 0005 | 0005 | YES | NO | LAT/LON | C:\REMIND | AD_*** | AP_140A |

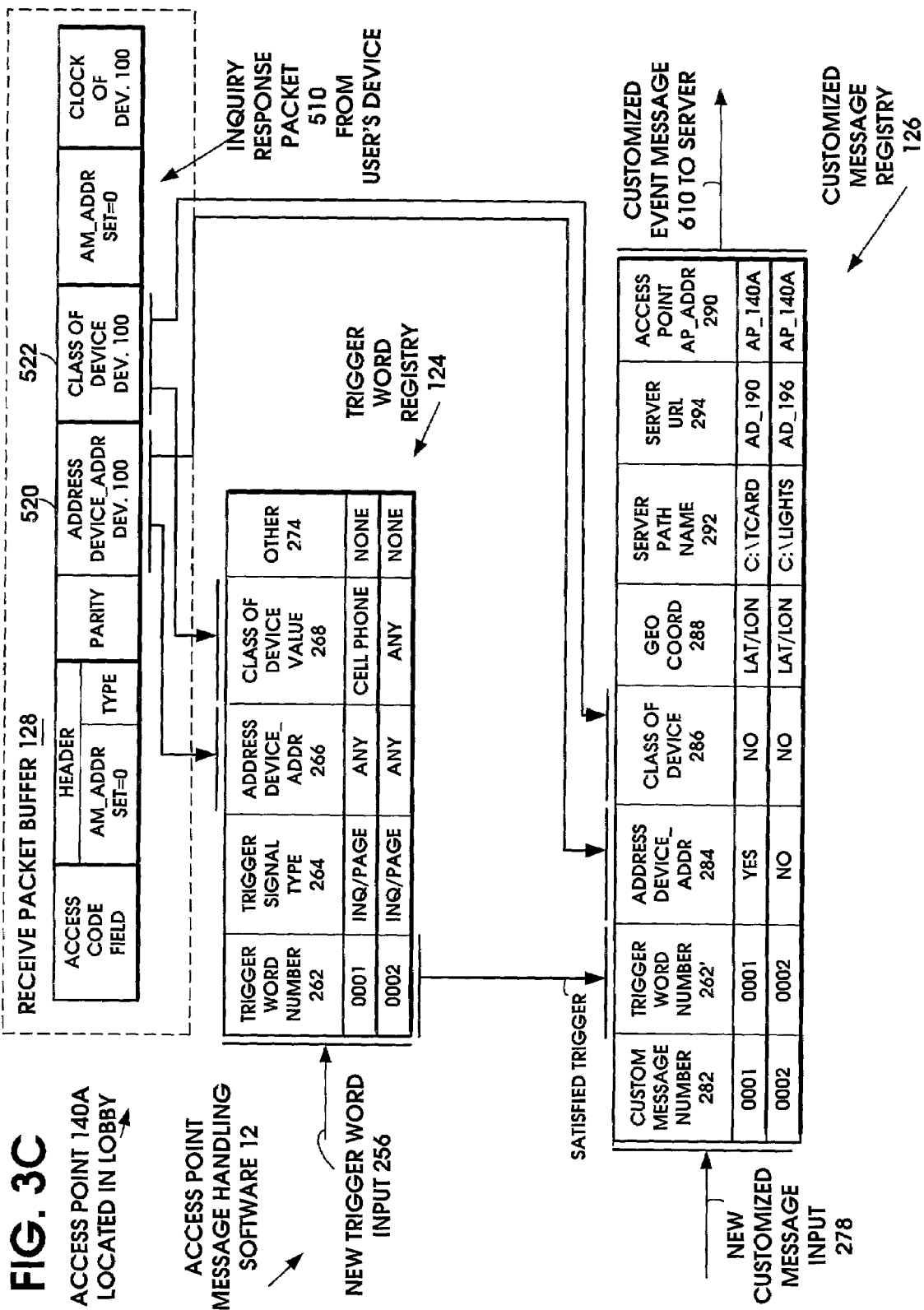

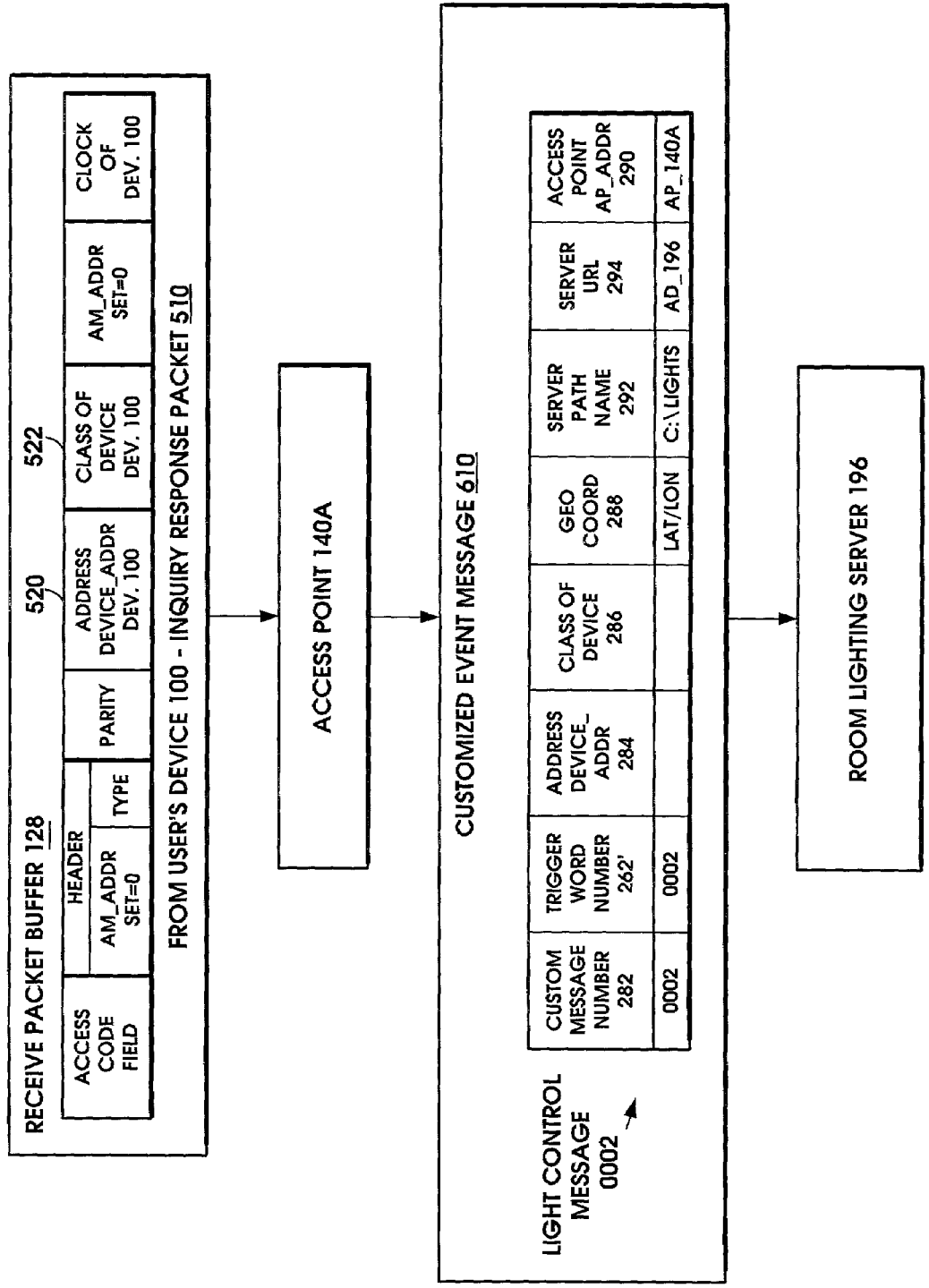

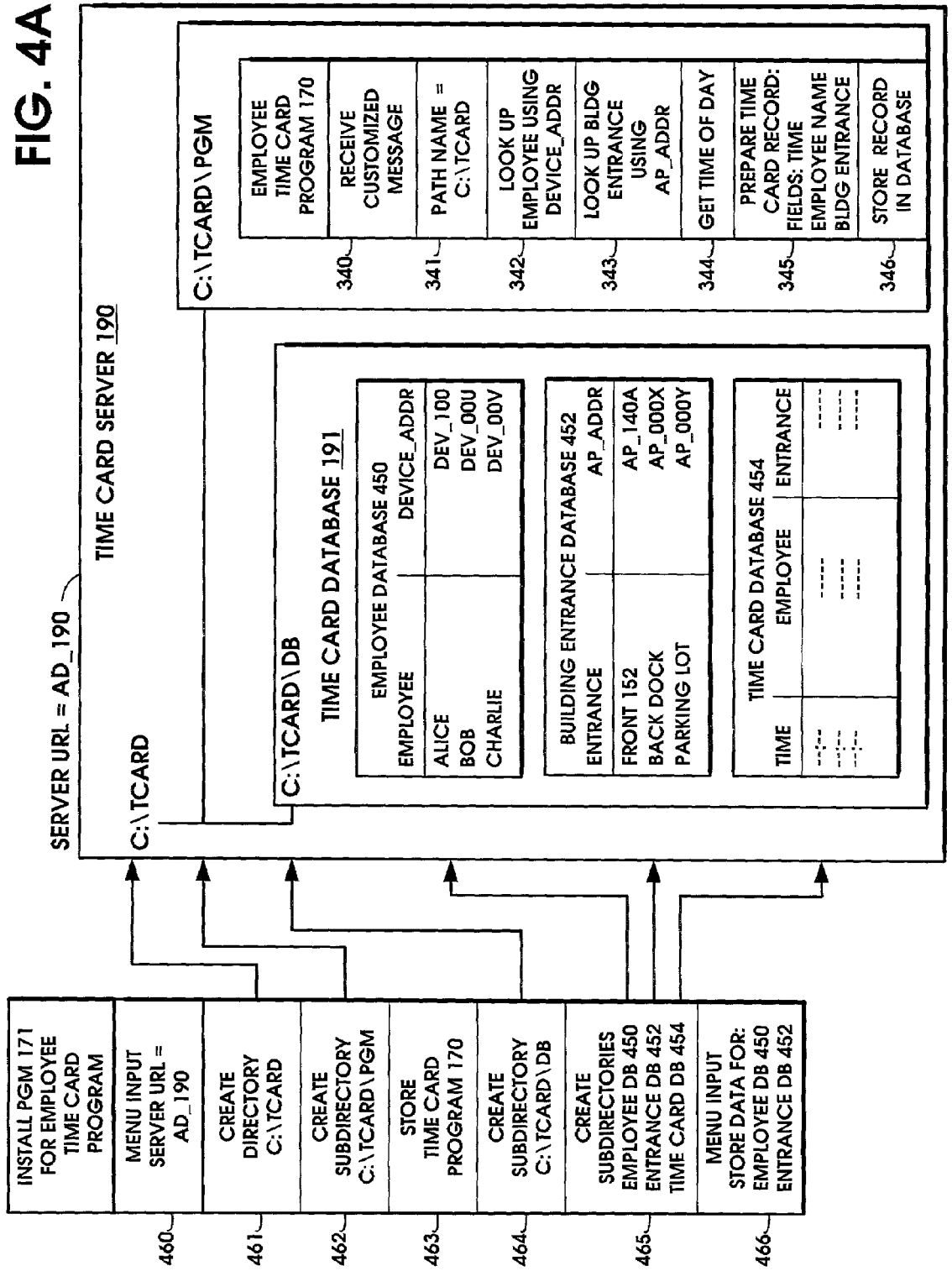

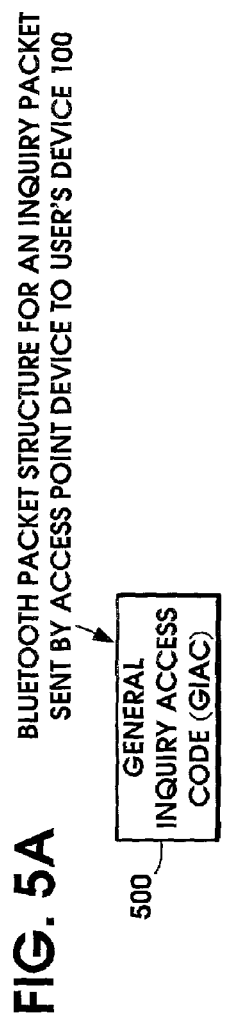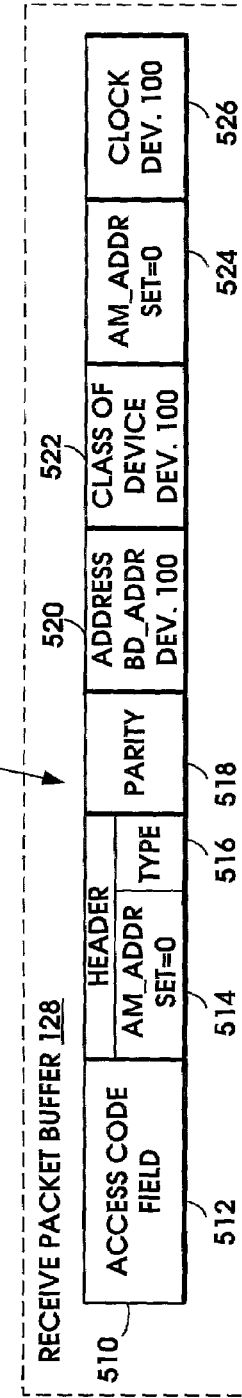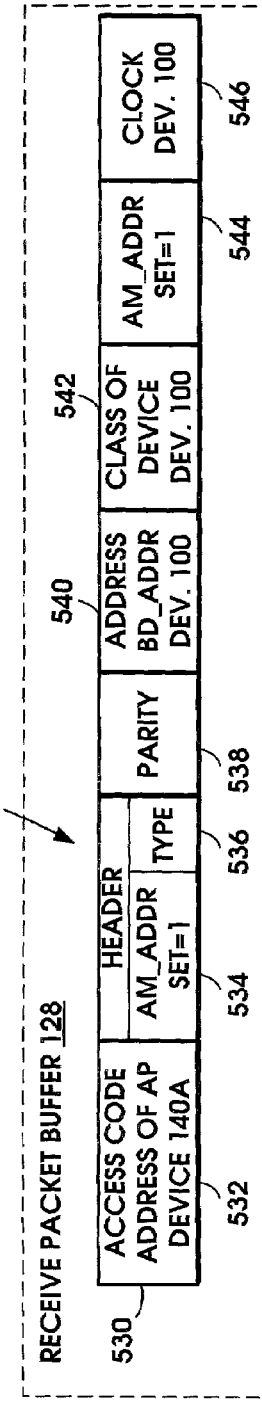

CUSTOMIZED MESSAGING BETWEEN WIRELESS ACCESS POINT AND SERVICES

FIELD OF THE INVENTION

The invention disclosed broadly relates to message authoring tools for ubiquitous computing and more particularly relates to improvements in message authoring tools for short range RF technology.

BACKGROUND OF THE INVENTION

Short-range mobile wireless devices frequently come within communicating range of stationary wireless devices, known as access points, which are connected to wireline local area networks (LANs) or wide area networks (WANs). The mobile wireless device can form a wireless link with a nearby access point to enable communication with network servers. The network servers can provide services to the mobile wireless devices, which can be customized to the particular access point currently nearest to and communicating with the mobile device. One example is a map display service where regional maps are stored in a network server and local maps characteristic of the neighborhood around an access point, can be downloaded to mobile devices near that access point. This requires that customized messages that are unique to a particular access point, be sent to the network server. As a mobile wireless device moves from one access point to another, the customized messages received by the network server must change to reflect the network identity of the new access point. What is needed in the prior art is a method of facilitating the preparation of customized messaging between an access point and a variety of service platforms.

Short-range wireless networks include both wireless personal area networks ("PANs") and wireless local area network ("WLANs"). Both of these networks have the common feature of operating in unlicensed portions of the radio spectrum, usually either in the 2.4 GHz Industrial, Scientific, and Medical (ISM) band or the 5 GHz Unlicensed-National Information Infrastructure ("U-NII") band. Wireless personal area networks use low cost, low power wireless devices that have a typical range of ten meters.

The best-known example of wireless personal area network technology is the Bluetooth Standard, which operates in the 2.4 GHz ISM band. Bluetooth is a short-range radio network, originally intended as a cable replacement. It can be used to create ad hoc networks of up to eight devices operating together. The Bluetooth Special Interest Group, *Specification Of The Bluetooth System*, Volumes 1 and 2, Core and Profiles: Version 1.1, 22 Feb., 2001, describes the principles of Bluetooth device operation and communication protocols. Bluetooth devices are designed to find other Bluetooth devices within their ten meter radio communications range and to discover what services they offer, using a service discovery protocol (SDP).

Examples of wireless local area network technology include the IEEE 802.11 Wireless LAN Standard and the HIPERLAN Standard, which operate in the 5 GHz U-NII band. The IEEE 802.11 Wireless LAN Standard is published in three parts as *IEEE* 802.11-1999; *IEEE* 802.11a-1999; and *IEEE* 802.11b-1999, which are available from the IEEE, Inc. web site http://grouper.ieee.org/groups/802/11. An overview of the HIPERLAN Type 2 principles of operation is provided in the Broadband Radio Access Networks (BRAN), *HIPERLAN Type 2; System Overview*, ETSI TR 101 683 VI.I.1 (2000-02).

What is needed is a way to facilitate the preparation of customized messaging between a short-range wireless access point and a variety of service platforms to provide the content for those messages.

SUMMARY OF THE INVENTION

The invention solves the problem of facilitating the preparation of customized messaging between a wireless access point and a variety of service platforms. In accordance with the invention, the wireless access point includes a registry of trigger words, each word specifying the particular events that must be detected by the access point upon receiving a packet from a mobile wireless device, in order to invoke the process of sending a corresponding server message to a selected server. The events can also be messages on the local area network connected to the access point, such as LAN access profiles or other network parameters. Message parameters can also be handles to specific services provided by the access point. When the wireless packet is received by the access point, the access point uses the various types of information in the received packet as stimuli to be matched with the trigger words stored in the trigger word registry. The trigger words can also specify LAN parameters. If there is a match, then a customized message corresponding to the matched trigger word is accessed from a customized message registry and sent to the server specified in the message. The selected server may be a server program running on a local personal computer connected to the access point. The selected server may also be a stand alone server connected to the access point over a LAN or it may be a network server located at a web site on the Internet. The selected server can use the information in the customized message to carry out a wide variety of service applications. For example, the selected server can form a query from the information in the customized message, and use it to access a database. The accessed content can then used for a particular service application or it can be returned to the access point for communication to the mobile wireless device.

In accordance with the invention, the wireless access point includes management software to present to the system administrator on a connected personal computer, a management menu of example trigger words and example server messages. The management software provides an editor to enable the administrator to optionally customize the example trigger words and/or server messages to suit particular applications. When the example trigger words and server messages have been modified into a form satisfactory to the administrator, they are passed to message handling software in the access point, to be loaded into the trigger word registry and the customized message registry, respectively. Updated example trigger words and example server messages can be downloaded to the access point from a web site on the Internet.

Service platforms running on network servers located at a web site on the Internet, occasionally offer new or updated service applications. The web site may also provide updated example trigger words and updated example server messages, which are available for downloading, to invoke the new or updated service. In accordance with the invention, the management menu of the wireless access point enables the downloading of these new or updated example trigger words and example server messages from the web site. If any modification to is required to the downloaded example trigger words and example server messages, the system administrator can edit them with the management software in the access point.

The manufacturers of service platform programs that are intended to run on a LAN server or in a local personal computer, will also occasionally offer new or updated service applications. In this case, the new server program, itself, must be installed onto the local server and new trigger words and server messages must be loaded into the access point. Manufacturers can make these new products available from their web sites, or from third party web sites on the Internet. In accordance with the invention, the management menu of the wireless access point enables the downloading of these new trigger words and server messages and new server programs, along with accompanying server installation programs. If any modification is required to the downloaded new trigger words and new server messages, the system administrator can edit them with the management software in the access point. The management software also provides an editor to enable the administrator to optionally customize the example server programs so as to be compatible with any modifications to the example server messages. When the example server program has been optionally modified into a form satisfactory to the administrator, it is installed onto the local server by using an installation program accompanying the new server program.

The example server messages initially presented by the management software to the system administrator on a connected personal computer, are provided with the data fields in a format that is compatible with the example server program. The system administrator has the option of adopting the example server messages without modification, except to designate the network address of the intended server. If the system administrator elects the option to modify the format of the example server messages, then the management software in the access point provides the ability to make corresponding, optional changes to the example server program in order to accommodate the changed data format of the customized server message, if necessary.

The resulting invention solves the problem of facilitating the preparation of customized messaging between a wireless access point and a variety of service platforms.

The invention can be applied to wireless personal area networks employing the Bluetooth Standard, and to wireless local area networks employing the IEEE 802.11 Wireless LAN Standard or the HIPERLAN Standard.

DESCRIPTION OF THE FIGURES

FIG. 1A is a network diagram showing a modification in the topology of the network of FIG. 1, in which there is a personal computer, such as a laptop computer, directly connected to the access points, and the access points are directly connected to the Internet.

FIG. 1C is a network diagram showing still another modification in the topology of the network of FIG. 1, where the access points are distributed within a home. The LAN 142 interconnects the access points with the personal computer 160. Several servers are shown connected by means of the LAN to the access points, to provide home-related services when signaled by the access points.

FIG. 2C illustrates the example trigger words partition 110 of the management software 10 in the access point 140A.

FIG. 2D illustrates the example server messages partition 112 of the management software 10 in the access point 140A.

FIG. 3C is a more detailed functional block diagram of the access point 140A of FIG. 3B, illustrating the data flow for the triggering of a particular trigger word and corresponding server message in response to the receipt of a particular wireless packet. When a wireless packet is received that satisfies one of the two trigger words in the registry, either the time card message or the light control message is sent from the access point to the respective server 190 or 196.

FIG. 3E is a data flow diagram showing the inquiry response packet 510 from the user's device 100 being detected by the access point 140A and the access point sending a light control message to the room lighting server 196.

FIG. 4A is a data flow diagram illustrating the install program 171 for the employee time card program 170. The install program is shown creating the database directory and the program directory in the server 190 for installation of the employee time card application.

FIG. 5A shows the Bluetooth packet structure for an inquiry packet 500 sent by a Bluetooth access point device to the user's device 100.

FIG. 5B shows the Bluetooth frequency hop synchronization (FHS) packet structure for an inquiry response packet 510 sent by the user's device 100.

FIG. 5C shows the wireless frequency hop synchronization (FHS) packet structure for the paging packet 530 sent by the user's Bluetooth device 100.

DISCUSSION OF THE PREFERRED EMBODIMENT

Figure 1:
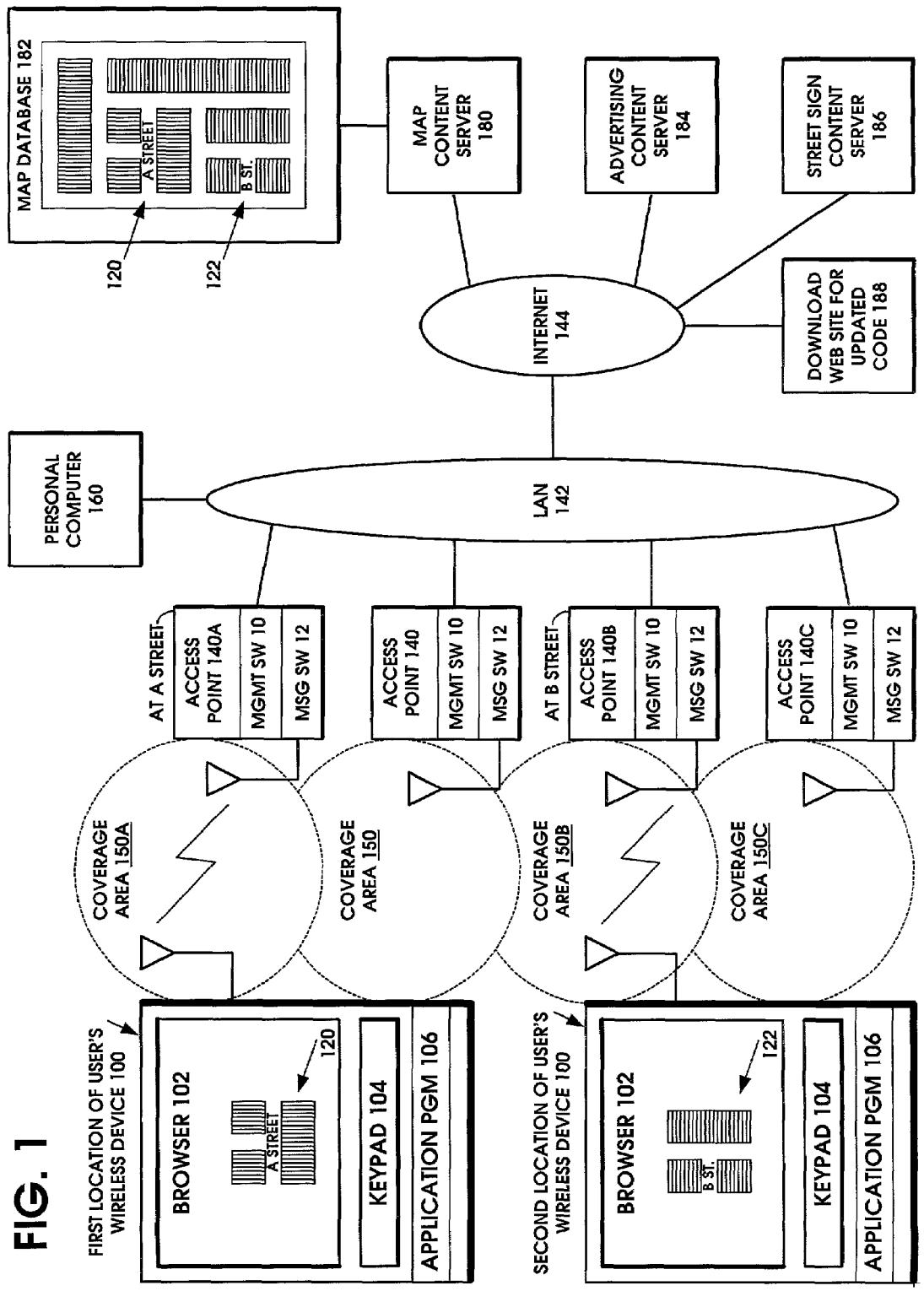
FIG. 1 is a network diagram according to one embodiment of the present invention showing a plurality of wireless access points 140, 140A, 140B, and 140C. The LAN 142 interconnects the access points with the personal computer 160 and the Internet 144, which in turn is connected to several content servers. The user's wireless device 100 is shown at a first location near a first wireless access point 140A and then later at a second location, near a second wireless access point 140B.

FIG. 1 is a network diagram according to one embodiment of the present invention showing the LAN 142 connected to a plurality of wireless access points 140, 140A, 140B, and 140C. Each respective access point has a corresponding coverage area 150, 150A, 150B, and 150C. Bluetooth wireless devices have typical coverage area with a radius of ten meters. IEEE 802.11 Wireless LAN devices and HIPERLAN wireless LAN devices have typical coverage area with a radius of one hundred meters. A user's wireless device 100 in FIG. 1 has a microbrowser 102, a keypad 104, and an application program 106. The user's wireless device 100 is shown at a first location near the access point 140A, with the location named "A Street". The figure also shows the user's device 100 at a second location near the access point 140B, with the location named "B Street". The LAN 142 is connected to the Internet 144, which is connected to three content servers, the map content server 180, the advertising content server 184, and the street sign content server 186. Connected to the map content server 180 is a map database 182. As the user's wireless device 100 passes within communicating range of the access point 140A, communication between the wireless device 100, access point 140A and the map database 182, accesses the portion 120 showing the location named "A Street" of a graphic map from the database 182 and transfers it for display on the browser 102 of the device 100. Later, as the user's wireless device 100 is within communicating range of the second access point 140B, communication between the device 100, access point 140B, and the map database 182, accesses the portion 122 showing the location named "B Street" of the map graphic from the database and transfers it for display on the browser 102 of the device 100. The mechanism for accomplishing this access and transfer of respective portions of the map graphic will be discussed below. FIG. 1 also shows the personal computer 160 which is used by the system administrator to configure the access points 140, 140A, 140B, and 140C. The Internet 144 is shown connected to a web site 188 for downloading updated code to the access points. FIG. 1A is a network diagram showing a modification in the topology of the network of FIG. 1, in which the personal computers 160 and 160' can be laptop computers which are directly connected to the respective access points 140A and 140B, and the access points are directly connected to the Internet 144 without needing a LAN.

Figure 2:
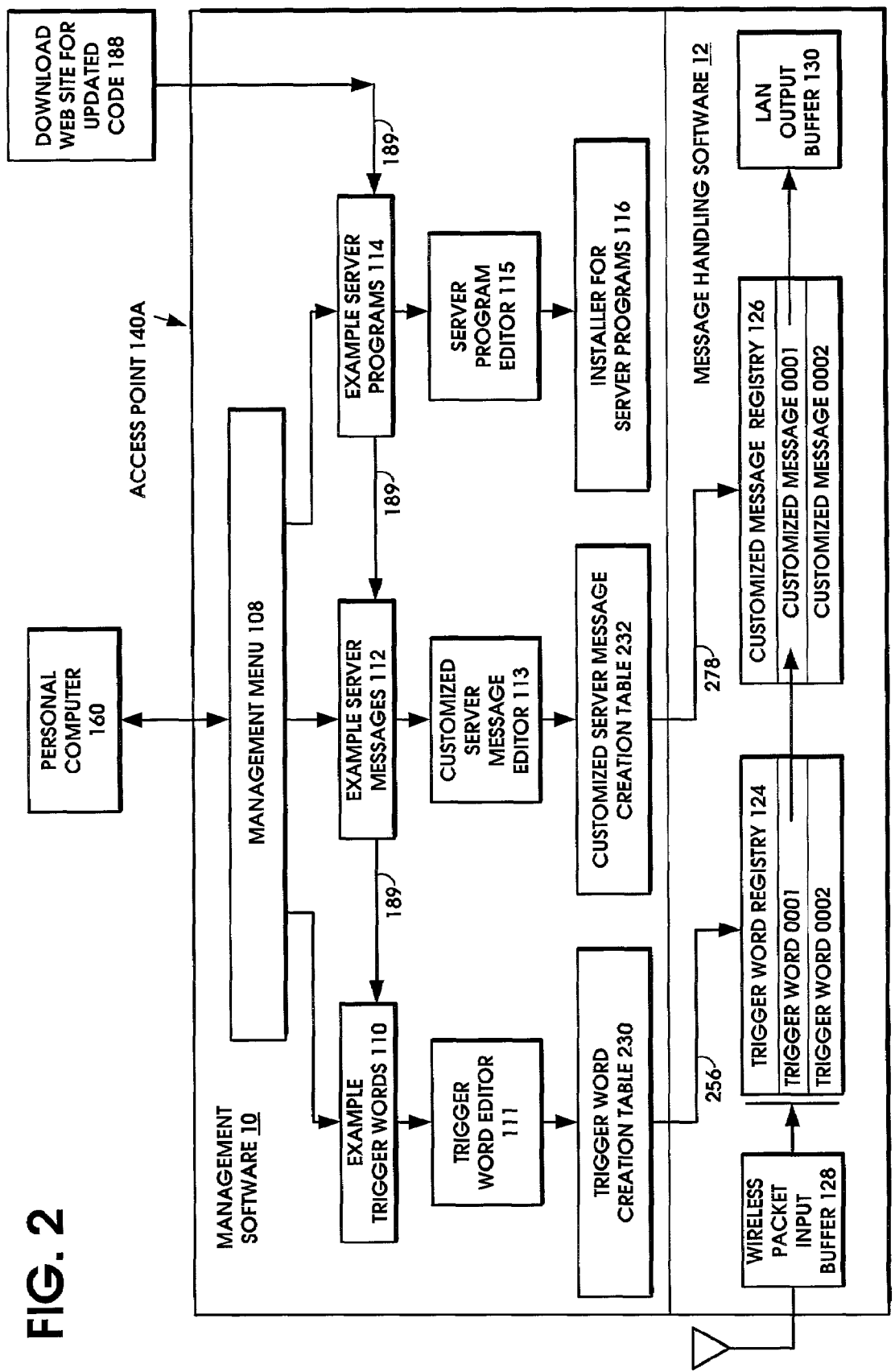
FIG. 2 is a functional block diagram of an access point 140A of FIG. 1B, according to one embodiment of the present invention, showing the management software partition 10 and the message handling software partition 12.

Returning to FIG. 1, each access point 140, 140A, 140B, and 140C includes management software 10 and message handling software 12, as shown in greater detail in FIG. 2. The message handling software 12 in each wireless access point includes a trigger word registry 124, each trigger word specifying the particular events that must be detected by the access point upon receiving a wireless packet in the input buffer 128 from a mobile wireless device 100, in order to invoke the process of sending a corresponding server message to a selected server. When the wireless packet is received by the access point, the access point uses the various types of information in the received packet as stimuli to be matched with the trigger words stored in the trigger word registry 124. If there is a match, then a customized message corresponding to the matched trigger word is accessed from a customized message registry 126 and sent to the server 180, for example, specified in the message.

The selected server may be a server program, for example the room lighting server program 196' running on a local personal computer 160 connected to the access point, as shown in FIG. 1C. FIG. 1C is a network diagram showing a modification in the topology of the network of FIG. 1, where the access points are distributed within a home 154. The home LAN 142 interconnects the access points 140, 140A, 140B, and 140C with the home personal computer 160. Several servers are shown connected by means of the LAN to the access points, to provide home-related services when signaled by the access points. Example servers for home-related services are music server 190' and its database 191', appliances server 192' and its database 193', reminder service server 194' and its database 195', and room lighting server 196' and its database 197'. Each of these servers and databases reside on the hard drive 192 of the home personal computer 160 of FIG. 1C. Each of the servers includes an output to the appliance and lighting control line 199, which is connected to the light L1 and appliance A1 in the foyer coverage area 150A and front door 156, the light L2 and appliance A2 in the living room coverage area 150, the light L3 and appliance A3 in the hallway coverage area 150B, and the light L4 and appliance A4 in the kitchen coverage area 150C. The LAN 142 is connected by the Internet to the web site 188, to enable downloading updated code to the access points.

Figure 1B:
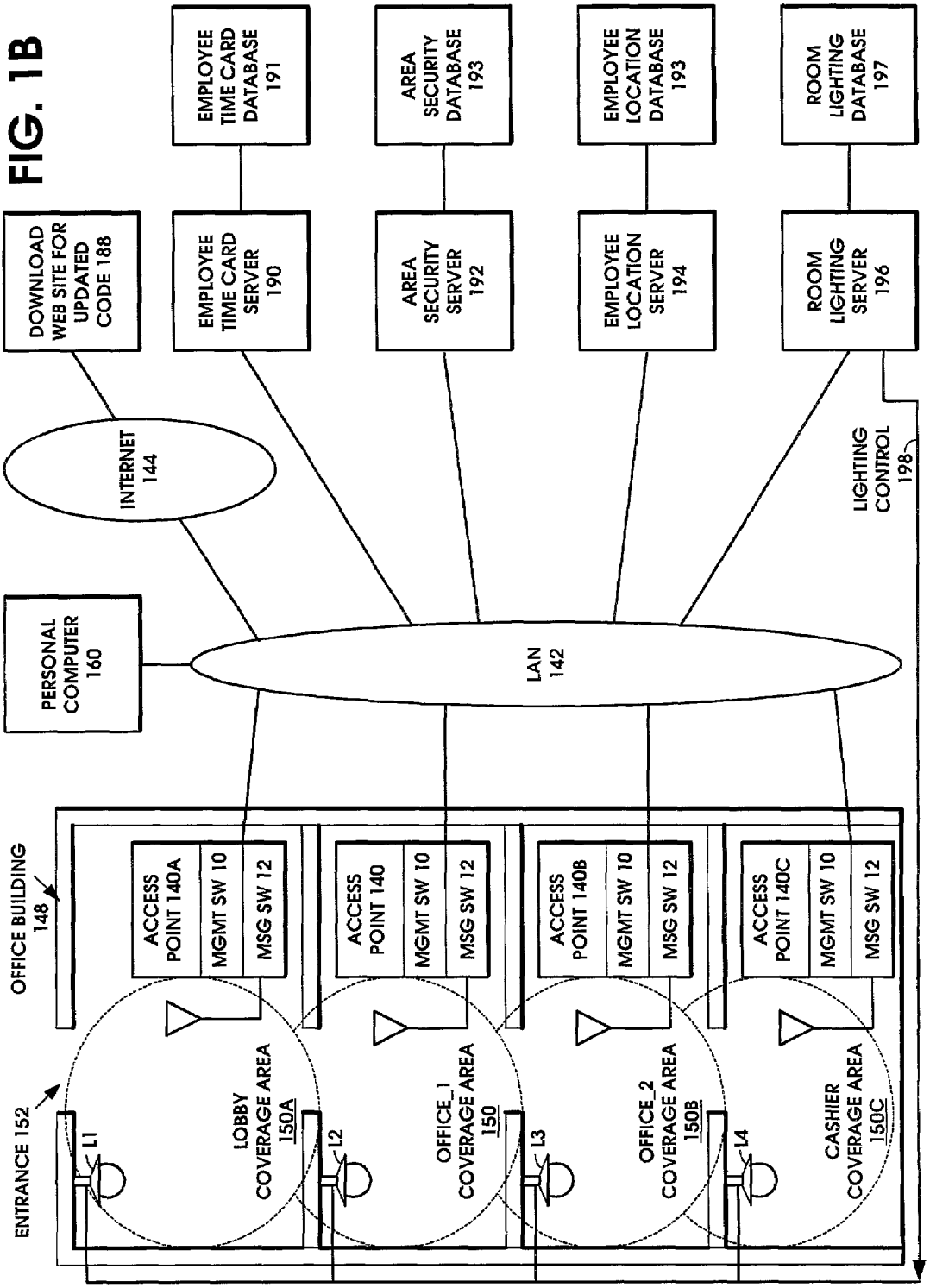
FIG. 1B is a network diagram showing another modification in the topology of the network of FIG. 1, where the access points are distributed within an office building. The LAN 142 interconnects the access points with the personal computer 160. Several servers are shown connected by means of the LAN to the access points, to provide business-related services when signaled by the access points.

The selected server may also be a stand alone server, for example the employee time card server 190, connected to the access point over a LAN 142, as shown in FIG. 1B. FIG. 1B is a network diagram showing a in the topology of the network of FIG. 1, where the access points are distributed within an office building 148. The LAN 142 interconnects the access points with the personal computer 160. Several servers are shown connected by means of the LAN to the access points, to provide business-related services when signaled by the access points. The office LAN 142 interconnects the access points 140, 140A, 140B, and 140C with the office personal computer 160. Several servers are shown connected by means of the LAN to the access points, to provide business-related services when signaled by the access points. Example servers for business-related services are employee time card server 190 and its database 191, area security server 192 and its database 193, employee location server 194 and its database 195, and room lighting server 196 and its database 197. Each of these servers is a stand alone server. The room lighting server 196 includes an output to the lighting control line 198, which is connected to the light L1 in the lobby coverage area 150A and entrance 152, the light L2 in the office__1 coverage area 150, the light L3 in the office__2 coverage area 150B, and the light L4 in the cashier coverage area 150C. The LAN 142 is connected by the Internet 144 to the web site 188, to enable downloading updated code to the access points.

The selected server may also be a network server, for example the map content server 180, located at a web site on the Internet, as shown in FIG. 1. Any of these selected servers can use the information in the customized message to carry out a wide variety of service applications. For example, the selected server can form a query from the information in the customized message, and use it to access appropriate database. The accessed content can then be used for a particular service application or it can be returned to the access point for communication to the mobile wireless device 100.

It is also possible that the message events occur later, e.g., when a LAN access profile is ready (message parameters IP address of the terminal, a port to terminal, Wap Push port to terminal, etc.), Obex link is ready (message param: IP:Port for sending Obex messages to temrinal), etc. Message parameters can be handles to specific services provided by the access point (e.g., Handle to Wap Push Port) for the terminal. The communication technique between access point and server can be anything from http messaging to RPC. The management software in access point is applied in defining the event, message, target, and communication protocol. It is not always necessary to state how the message will be received in the target-server, since that is mainly up to target servers. This same messaging can be enhanced to GSM/GPRS/UMTS base stations. When a terminal forms a connection to a GSM link, a message is delivered to particular server.

Figure 2A:
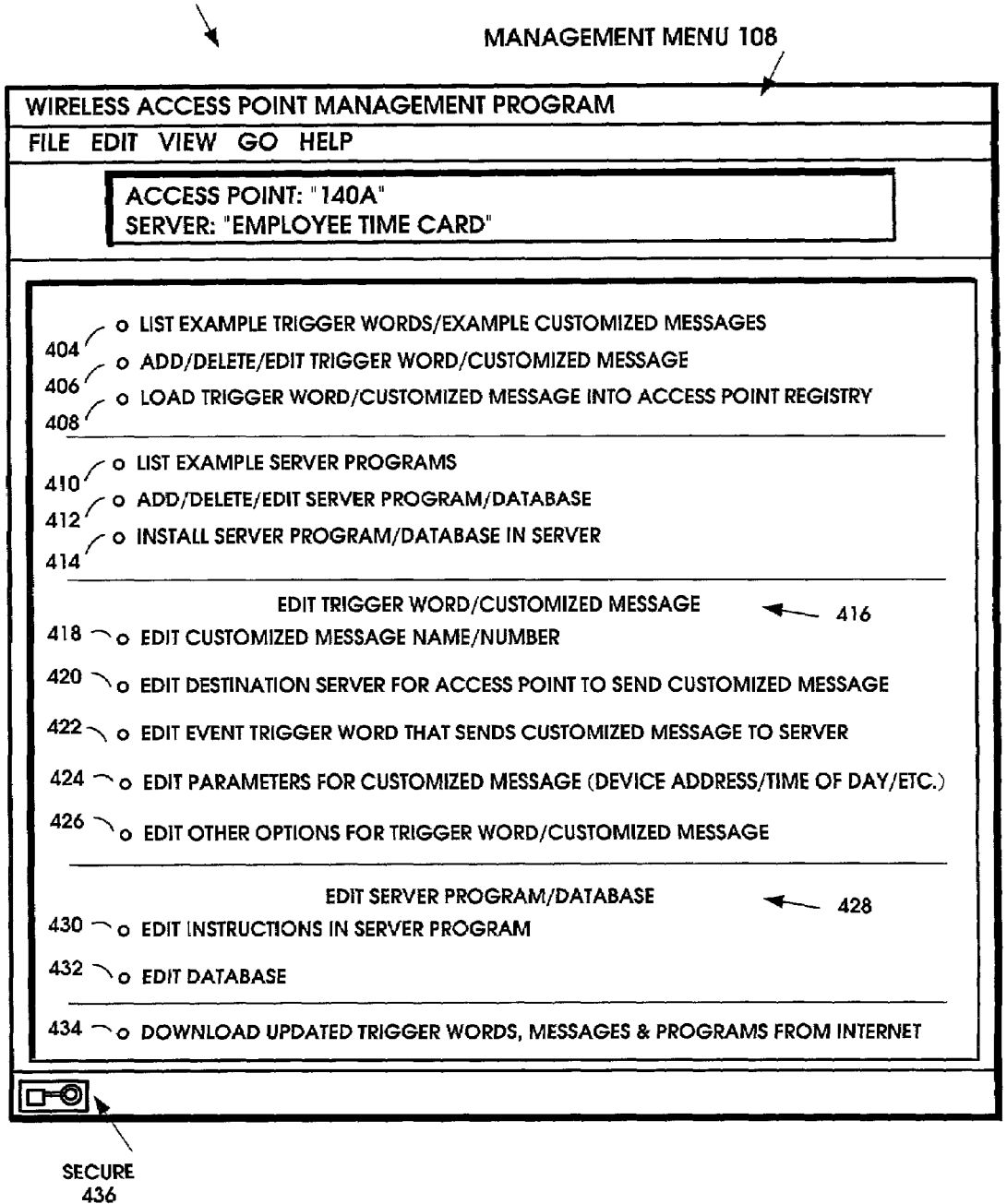
FIG. 2A illustrates the exemplary appearance of the management menu 108 of the access point 140A, displayed on the personal computer 160 of FIG. 1B. The menu 108 is used during the initial setup of the access point 140A to select server programs to be installed in the servers, select trigger words to detect certain types of wireless packets, and to select server messages for sending to the servers in response to satisfying a trigger word.

Each wireless access point, for example 140A, includes management software 10 to present to the system administrator on a connected personal computer 160, a management menu 108 of example trigger words and example server messages. FIG. 2A illustrates the exemplary appearance of the management menu 108 of the access point 140A, displayed on the personal computer 160. The menu 108 is used during the initial setup of the access point 108 to select example server programs 114 to be installed in the servers 180, etc., select example trigger words 110 to detect certain types of wireless packets, and to select example server messages 112 for sending to the servers in response to satisfying a trigger word. FIG. 2C illustrates five example trigger words 110 and FIG. 2D illustrates the corresponding five example server messages 112.

The management software 10 provides a trigger word editor 111 to enable the administrator to optionally customize the example trigger words 110 in a trigger word creation table 230. A server message editor 113 is provided to edit example server messages 112 in a server message creation table 232, to suit particular applications. When the example trigger words 110 and example server messages 112 have been modified into a form satisfactory to the administrator, they are passed to the message handling software 12 in the access point, to be loaded over line 256 into the trigger word registry 124 and over line 278 into the customized message registry 126, respectively. Updated example trigger words 110 and example server messages 112 can be downloaded to the access point on line 189 from a web site 188 on the Internet.

Service platforms running on network servers 180 located at a web site on the Internet 144, occasionally offer new or updated service applications. The web site may also provide updated example trigger words and updated example server messages, which are available for downloading, to invoke the new or updated service. The management menu 108 of the wireless access point, for example 140A, enables the downloading of these new or updated example trigger words 110 and example server messages 112 from the web site. If any modification is required to the downloaded example trigger words 110 and example server messages 112, the system administrator can edit them with the editors 111 and 113 in the management software 10 in the access point.

Figure 2B:
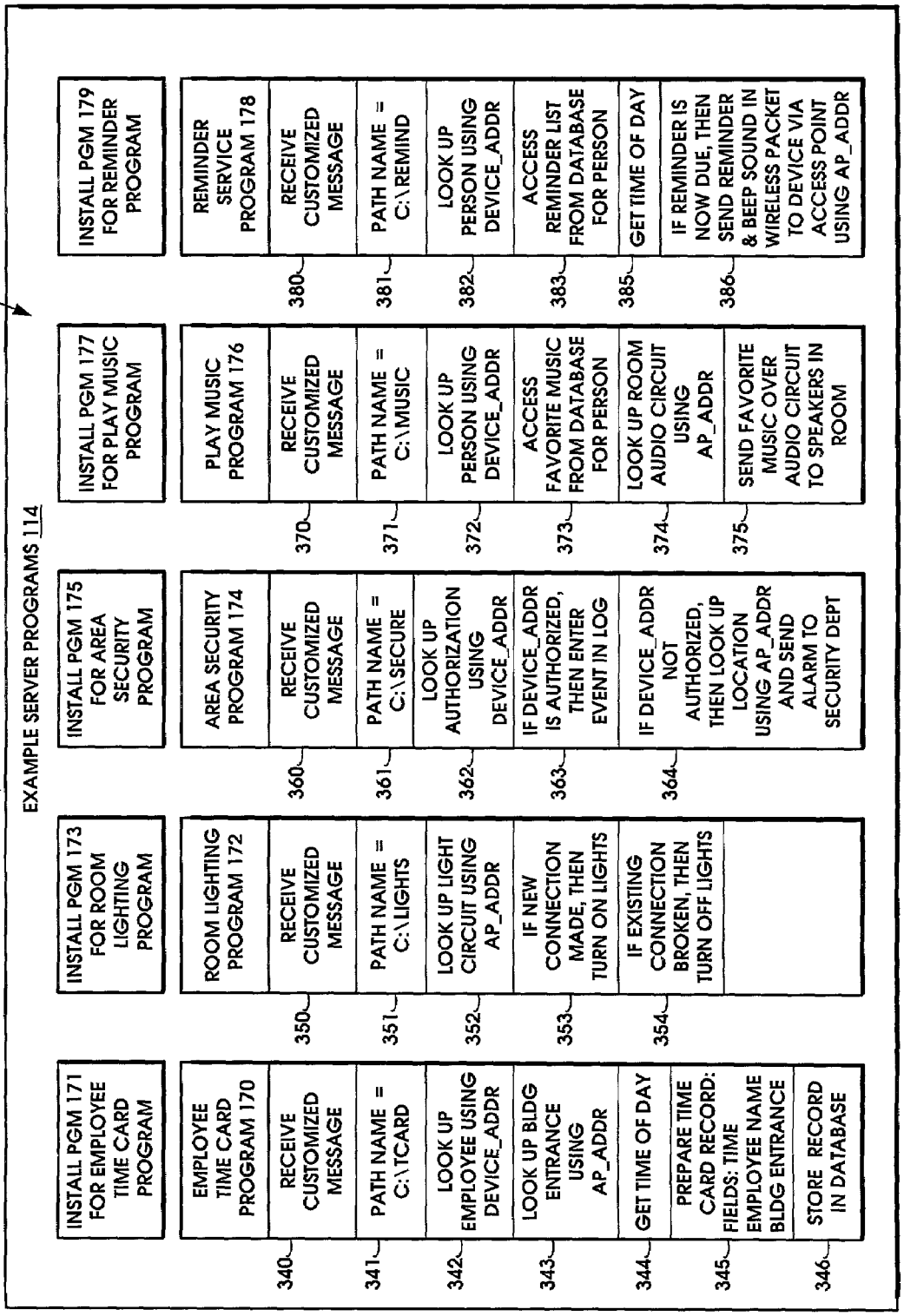
FIG. 2B illustrates the example server programs partition 114 of the management software 10 in the access point 140A. The partition 114 includes the installation programs for the example server programs.

The manufacturers of service platform programs that are intended to run on a LAN server, for example the employee time card server 190 of FIG. 1B, or in a local personal computer 160, for example the room lighting server program 196' of FIG. 1C, will also occasionally offer new or updated service applications. In this case, the new server program, itself, must be installed onto the local server 190 or 160 and new trigger words and server messages must be loaded into the access point, for example 140A. Manufacturers can make these new products available from their web sites 188, or from third party web sites, on the Internet. The management menu 108 of the wireless access point of FIG. 2, enables the downloading of these new trigger words 110 and server messages 112 and new server programs 114 over line 189, along with accompanying server installation programs. If any modification to is required to the downloaded new trigger words 110 and new server messages 112, the system administrator can edit them with the management software 10 in the access point. The management software provides an editor 115 to enable the administrator to optionally customize the example server programs 114 to be compatible with any modifications to the example server messages in the server message creation table 232. When the example server program 114 has been optionally modified into a form satisfactory to the administrator, it is installed by means of the installer 116 into the local server 190 or 160 by using an installation program accompanying the new server program. FIG. 2B illustrates the example server programs 114 downloaded from various web sites 188. The example server programs 114 are shown accompanied by their installation programs. Employee time card server program 170 is accompanied by its installation program 171. Room lighting server program 172 is accompanied by its installation program 173. Area security server program 174 is accompanied by its installation program 175. Play music server program 176 is accompanied by its installation program 177. And, reminder service server program 178 is accompanied by its installation program 179.

Some server programs will ignore empty fields that are otherwise optional in a server message, such as documentation numbers. Where the system administrator elects to modify an example server message by modifying or omitting data in an optional field, no change is necessary to the server program. However, if the system administrator finds it necessary to modify an example server message by omitting data in a required field, by substituting a different type of data in a required field, or by adding a new field, then some modification may be needed to the server program. In accordance with the invention, the management menu 108 of the wireless access point 140A optionally presents to the system administrator on a connected personal computer 160, example server programs 114 corresponding to the example server messages 112. The management software 10 provides an editor 115 to enable the administrator to optionally customize the example server programs 114 to be compatible with any modifications to the example server messages 112. When the example server program has been optionally modified into a form satisfactory to the administrator, it is installed into a selected server 190, for example, by using an installation program 116 accompanying the example server program 114. Updated example server programs 114 with their accompanying installation programs 116, can be downloaded to the access point 140A along with the example trigger words 110 and example server messages 112, from a web site 188 on the Internet.

The example server messages 112 initially presented by the management software 10 to the system administrator on a connected personal computer 160, are provided with the data fields in a format that is compatible with the example server program 114. The system administrator has the option of adopting the example server messages 114 without modification, except to designate the network address of the intended server 190. If the system administrator elects the option to modify the format of the example server messages 112, then the management software 10 in the access point 140A provides the ability to make corresponding, optional changes to the example server program 114 in order to accommodate the changed data format of the customized server message, if necessary. The resulting server program can then make use of all of the data available in the customized server message to perform the intended application. The customized message will contain the required data in a format that is compatible with the optionally modified server program. The server 190 can use this information for an appropriate query of its database 191 to access the content, under control of the server program. The content is then used in the particular service application provided by the server program or returned to the access point 140A for communication to the mobile device 100.

FIG. 2A illustrates the exemplary appearance of the user interface menu 108 of the access point 140A, displayed on the personal computer 160 of FIG. 1B. Menu 108 is used during the initial setup of the access point 104A, to select server programs to be installed in servers, to select trigger words to detect certain types of wireless packets, and to select server messages for sending to the servers in response to satisfying a trigger word. The management menu 108 has a first selection 404 to list example trigger words and example customized messages, such as is shown in FIG. 2C and FIG. 2D, respectively. The selection 406 is to add, delete, or edit a trigger word or a customized message. The selection 408 is to load the trigger word and customized message into the access point registry 124 and 126, respectively. The selection 410 lists the example server programs, as is shown in FIG. 2B. Selection 412 is to add, delete, or edit a server program or database. Selection 414 is to install a server program or database in a server. Section 416 of the menu 108 of FIG. 2A provides several selections to edit trigger words or customized messages. Selection 418 edits a customized message name or number. Selection 420 edits a destination server for the access point to send a customized message. Selection 422 edits an event trigger word that sends the customized message to the server. Selection 424 edits parameters for customized messages, such as the device address, time of day, etc. Selection 426 edits other options for the trigger word and customized message. Section 428 of the management menu 108 of FIG. 2A provides selections for editing a server program and database. Selection 430 edits instructions in the server program and selection 432 edits the database. Selection 434 downloads the updated trigger words, messages and programs from the Internet. In order to provide a secure link between the personal computer 160 displaying the management menu 108, and any network nodes such as a website, a secure connection is obtained with the security software 436, such as the secure sockets layer.

FIG. 2B illustrates the example server programs 114 of the management software 10 in access point 140A. The partition storing the example server programs 114 also includes the installation programs for the server programs. FIG. 2B shows the employee time card program 170 which is installed in a server by means of the installation program 171. Employee time card program 170 has the operational steps 340 through 346. When the installation program 171 installs the employee time card program 170 in a server, steps 340 through 346 are executed upon the receipt of a customized message from an access point. Step 340 receives a customized message. Step 341 established the path name c:\tcard. Step 342 looks up the employee in the database using the device address value provided by the customized message. Step 343 looks up the building entrance location in the database using the access point address provided by the customized message. Step 343 gets the time of day. Step 345 prepares a time card record which includes fields for the time, the employee name, and the building entrance. Then step 346 stores the record in the database.

The room lighting program 172 shown for the management software 10 of FIG. 2B, will be installed by the installation program 173 in a server. Room lighting program 172 includes steps 350 through 354. Steps 350 through 354 are executed in the server when in receives a customized message. Step 350 receives the customized message. Step 351 establishes the path name c:\lights. Step 352 looks up the lighting circuit in the database using the access point address supplied by the customized message. Step 353 determines if a new connection has been made to a wireless device 100 by the access point, then turn on the lights by sending a signal on the lighting control to the lighting circuits. Step 354 determines if an existing connection is broken between a wireless device 100 and the access point, then turn off the lights by sending a turn-off signal on the lighting circuit.

The area security program 174 in the management software 10 of FIG. 2B is installed by the installation program 175 in a server. The area security program 174 has steps 360 through 364. The area security program 174 executes the steps 360 through 364 upon the receipt of a customized message. Step 360 receives the customized message. Step 361 establishes the pathname c:\secure. Step 362 looks up the authorization in the database using the device address provided by the customized message. Step 363 determines if the device address is authorized and if its, then an entry is made of the security event in the log. Step 364 determines if the device address is not authorized, then the location of the access point is looked up in the database using the access point address supplied by the customized message, and an alarm is sent to the security department.

The play music program 176 in the management software 10 of FIG. 2B, is installed in a server by means of the installation program 177. The play music program 176 includes steps 370 through 375. The play music program 176 executes steps 370 through 375 upon the receipt of a customized message. Step 370 receives the customized message. Step 371 establishes the pathname c:\music. Step 372 looks up a person using the device address received in the customized message. Step 373 accesses the favored music from the database for the person. Step 374 looks up the room audio circuit for the room where the access point is located, using the access point address supplied in the customized message. Step 375 sends the favored music over the audio circuit to the speakers in the room.

The reminder service program 178 in management software 10 in FIG. 2B, is installed in a server by means of the installation program 179. The reminder service program 178 includes steps 380 through 386. The reminder service program 178 executes steps 380 through 386 upon the receipt of a customized message. Step 380 receives the customized message. Step 381 establishes the pathname c:\remind. Step 382 looks up the person in the database using the device address received in the customized message. Step 383 accesses the reminder list from the database for the person. Step 385 gets the time of day. Step 386 determines if a reminder is now due, then the reminder is sent and a beep sound is also sent to the access point using the access point address, for the purpose of forwarding the reminder and the beep sound in a wireless packet to the wireless device.

Figure 3:
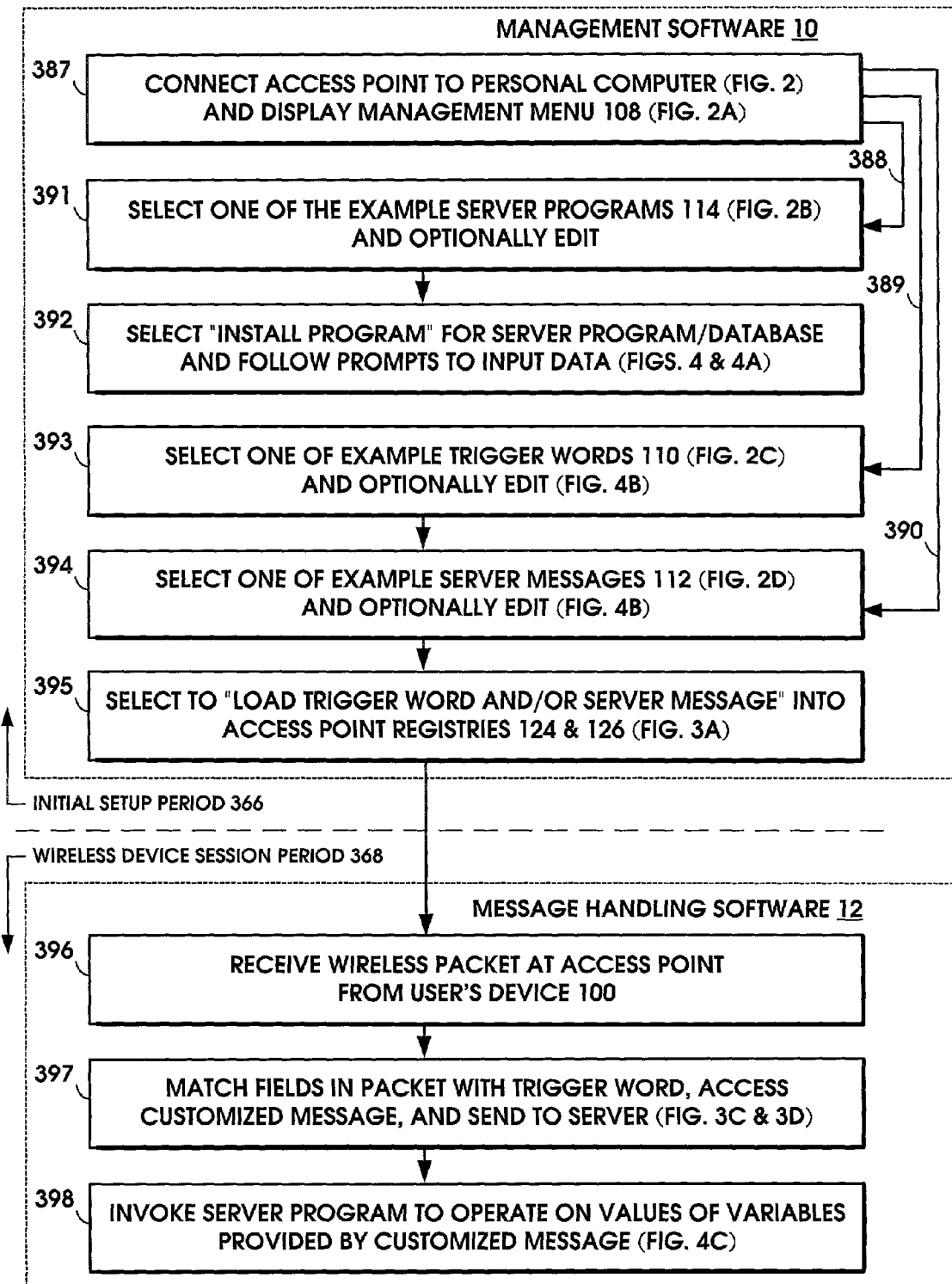
FIG. 3 is an exemplary flow diagram of the processing in an access point during the initial setup period and during the wireless device session period.
Figure 3A:
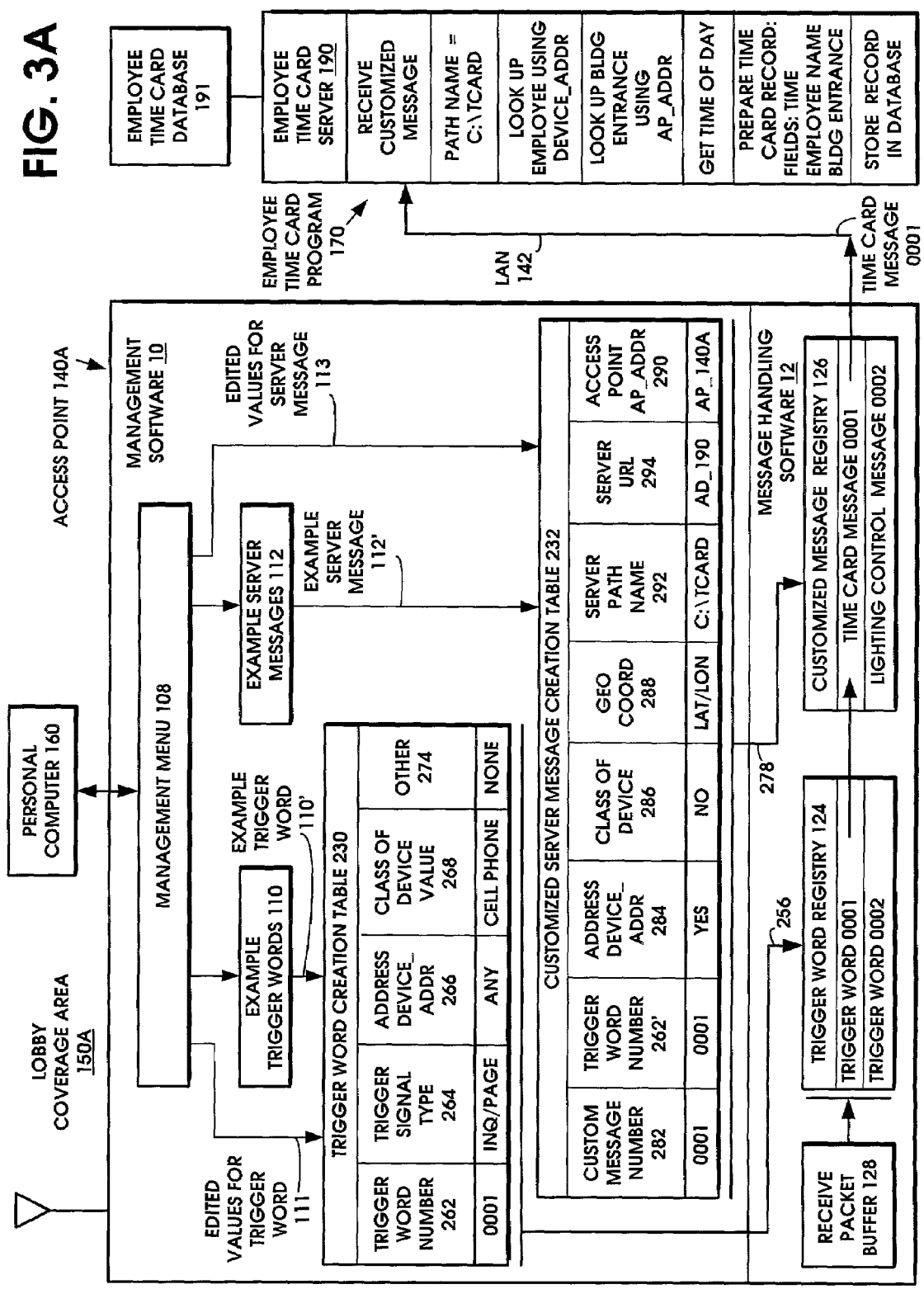
FIG. 3A is a functional block diagram of the access point 140A of FIG. 1B, illustrating the data flow for the creation of a trigger word and a customized server message for an employee time card application. When a wireless packet is received that satisfies the trigger word, the time card message is sent from the access point to the employee time card program in the server 190.

FIG. 3 is an exemplary flow diagram of the processing in an access point during the initial setup period 366 and during the wireless device session 368. The management software 10 includes steps 387, 391, 392, 393, 394 and 395. In step 387, the access point is connected to a personal computer as shown in FIG. 2, and the management menu 108 is displayed, as shown in FIG. 2A. The system administrator using the management menu 108 will make a selection along path 388, 389 or 390. Path 388 leads to step 391. To select one of the example server programs 114 in FIG. 2B for the purpose of either installing the server program in a server or optionally editing the program. Step 391 flows to step 392 where the system administrator selects to install the program and the corresponding databases by following the prompts to input data as described in FIGS. 4 and 4A. Instead, if the system administrator chooses path 389 in step 387, the process flows to step 393 where the system administrator selects from the menu 108 one of the example trigger words 110 shown in FIG. 2C for optional editing as shown in FIG. 4B. The program then flows to step 394 where the system administrator can select one of the example server messages 112 shown in FIG. 2D and optionally edit the server message as shown in FIG. 4B. The process then flows to step 395 where the system administrator then selects to load the trigger word and/or the server message into the access point registries 124 and 126, respectively, as shown in FIG. 3A. If instead, the system administrator in step 387 selects path 390, the process directly flows to step 394 to select one of the example server messages 112 and then the process flows to step 395 to load the server message into the access point registry 126. After the system administrator has successfully selected example server programs, example trigger words and example server messages during the initial setup period 366, the process flows to the wireless device session period 368. The message handling software 12 in FIG. 3 includes steps 396, 397 and 398. In step 396, a wireless packet is received at the access point from a user's device 100. Then in step 397, the fields in the received packet are matched with trigger words and a corresponding message is accessed and sent to the server as shown in FIG. 3C and FIG. 3D. Then in step 398, the server program is invoked in response to having received the customized message, so as to operate on values of variables provided by the customized message, as shown in FIG. 4C.

FIG. 3A is a functional block diagram of the access point 140 of FIG. 1B, illustrating the dataflow for the creation of a trigger word in a customized server message for employee time card application. When a wireless packet is received that satisfies the trigger word, the time card message is sent from the access point to the employee time card program in the server 190. FIG. 3A shows the trigger word creation table 330. The trigger word creation table has five fields: the trigger word number 262, the trigger signal type 264, the device address 266, the class of device 268, and other data 274. A particular trigger word 00001 is shown stored in the trigger word creation table 230. The trigger word 0001 specifies a trigger signal type as being either and inquiry packet or a paging packet. The device address can be any device address. The class of device is a cell phone and there is no other data. The trigger word 0001 was stored in the trigger word creation table 230 as a result of the system administrator having selected an example trigger word 110 which flows along path 110' into the trigger word creation table, after which the system administrator edits the trigger word along path 111, using the management menu 108. After the trigger word 0001 has been completed to the satisfaction of the system administrator, it is loaded along path 256 into the trigger word registry 124. The customized server message creation table 232 in FIG. 3A has the following fields: custom message number 282, the trigger word number 262', the device address 284, class of device 286, the geographic coordinate field 288, the server path name 292, the server URL 294 and the access point address field 290. A particular customized message is shown stored in the message creation table 232 in FIG. 3A. It has a custom message number 0001 and a trigger word number 00001. It specifies that a device address is to be included in the server message, the class of device is not to be included, the latitude and longitude data is to be included in the geographic coordinate field, that the server path name is specified to be c:\tcard, the server URL is specified as being AD-190, and the access point address is specified as being AP-140A. The customized message 0001 stored in the message creation table 232, is stored there in response to the system administrator having selected the message from the example server messages 112 over the path 112', using the management menu 108. The system administrator has edited the content of the customized server message using editing values over path 113 with the management menu 108. After the customized server message 0001 has been completed to the satisfaction of the system administrator, the customized server message is loaded over path 278 into the customized message registry 126. FIG. 3A also shows the message handling software 12 in the access point 140A, which includes the receive packet buffer 128, the trigger word registry 124, the customized message registry 126. When a wireless packet is received from the user's wireless device 100, and buffered in the receive packet buffer 128, the various fields of the packet are compared with corresponding fields in the trigger words stored in the trigger word registry 124. If a match is found, for example, the trigger word 0001, then the corresponding customized message is accessed from the customized message registry 126 and output to the local area network 142. In this example, the time card message 00001 is accessed and output on the LAN 142 for transmission to the employee time card server 190, as is specified by the server URL field in the customized message. As was previously described, the employee time card server 190 includes the employee time card program 170 which receives the customized message from the access point 140A. The employee time card program 170 then proceeds to execute the steps as previously described.

Figure 3B:
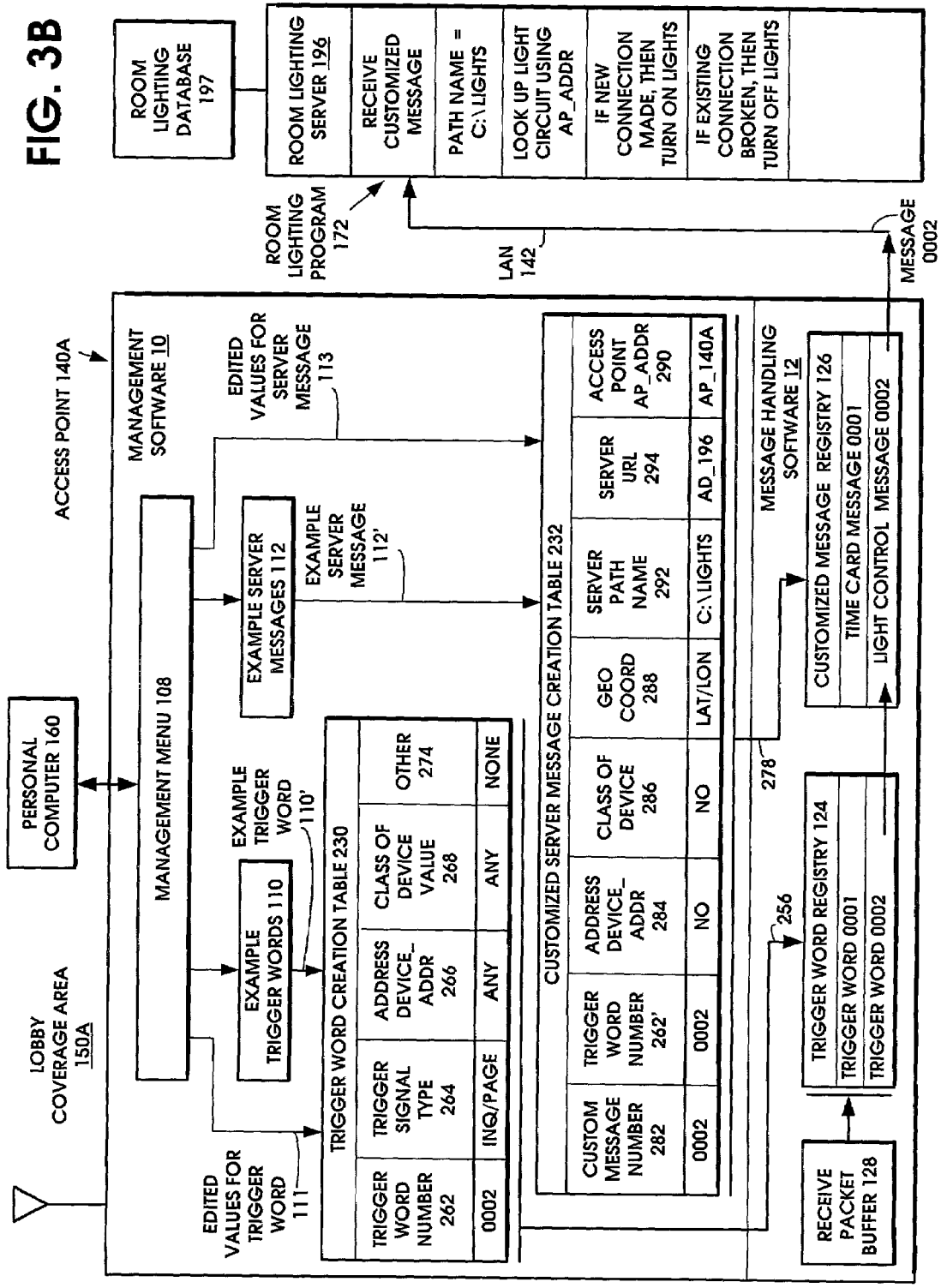
FIG. 3B is a functional block diagram of the access point 140A of FIG. 1B, illustrating the data flow for the creation of a trigger word and a customized server message for a room lighting control application. When a wireless packet is received that satisfies the trigger word, the light control message is sent from the access point to the room lighting program in the server 196.
Figure 3D:
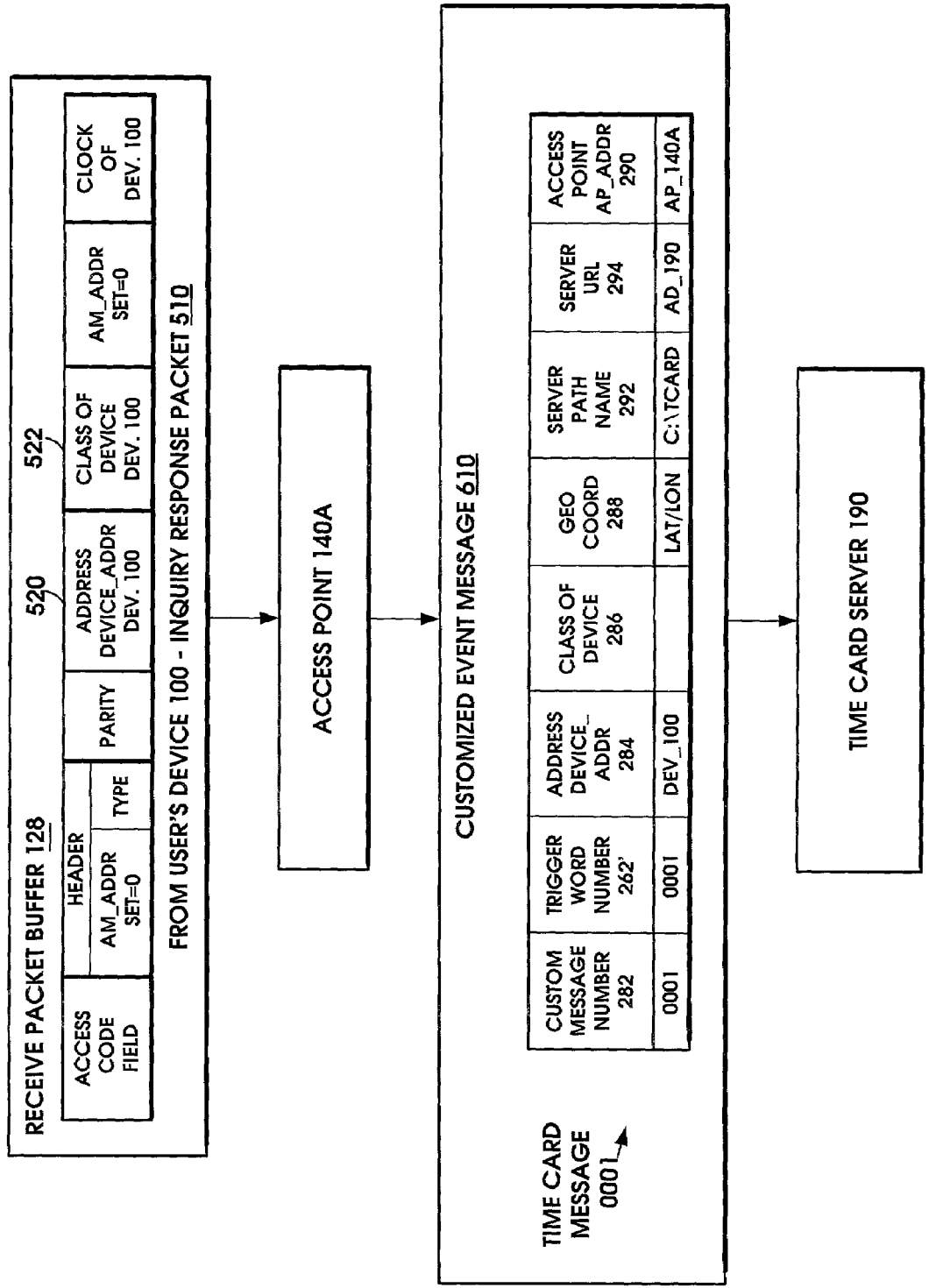
FIG. 3D is a data flow diagram showing the inquiry response packet 510 from the user's device 100 being detected by the access point 140A and the access point sending a time card message to the time card server 190.

FIG. 3B is a functional block diagram of the access point 140A of FIG. 1B, illustrating the data flow for the creation of a trigger word and a customized server message for a room lighting control application. When a wireless packet is received that satisfies the trigger word, the light control message is sent from the access point to the room lighting program in server 196. The trigger word 0002 is stored in the trigger word creation table 230 of FIG. 3B, and has been accessed from the example trigger words 110 and edited by the system administrator, after which the trigger word 0002 is loaded over path 256 into the trigger word registry 124. The customized message 0002 has been loaded by the system administrator from a selection from the example server messages 112 and edited by the system administrator, after which the customized message 0002 is transferred from the message creation table 232 over path 278 and loaded into the customized message registry 126. When the access point 140A receives a wireless packet from the user's device 100 having fields which match one of the trigger words, such as trigger word 0002, in the trigger word registry 124, the corresponding customized message, such as the light control message 0002 in the customized message registry 126, is output over the local area network 142 to the room lighting server 196. The room lighting server 196 was specified in the server URL field of the customized message. Upon receiving the customized message, the room lighting server 196 executes the room lighting program 172, as was previously described.

FIG. 3C is a more detailed functional block diagram of the access point 140A of FIG. 3B, illustrating the dataflow for the triggering of a particular trigger word and corresponding server message in response to the receipt of a particular wireless packet. When a wireless packet is received that satisfies one of the two trigger words in the registry, either the time card message or the light control message is sent from the access point to the respective server 190 or 196, respectively. FIG. 3C shows the receive packet buffer 128 which has received the inquiry response packet 510 from the user's device 100. It is seen that field 520 of the packet 510 includes the address of the device 100 which is compared with the field 266 in the trigger word registry 124. There it is seen that the trigger word 0001 specifies that any address will satisfy the word. Trigger word 0002 also specifies that any address will satisfy the word. The inquiry response packet 510 has the field 522 which specifies the class of device of the user wireless device 100. That information is applied to the class of device field 268 of the trigger word registry 124. Trigger word 0001 specifies that a cell phone must be the class of device. Trigger word 0002 specifies that any class of device will satisfy. In this example, the class of device specified in field 522 of the inquiry response packet 510 is not a cell phone. Therefore, only the trigger word 0002 is satisfied in the trigger word registry 124. This signal is then passed as a satisfied trigger signal to the customized message registry 126, where the corresponding trigger word number in field 262' of "0002" is located. The corresponding custom message number 0002 is then accessed and then output as a customized event message 610 to the server. In this example, custom message 0002 is a light control message and therefore the custom message 0002 is sent to the server 196 for the lighting control application.

FIG. 3E is a dataflow diagram showing the inquiry response packet 510 from the user's device 100 being detected by the access point 140A and the access point sending a light control message to the room lighting server 196. FIG. 3E shows the actual data content of the light control message 0002 as it is sent by the access point 140A to the room lighting server 196.

FIG. 3D is a dataflow diagram showing the inquiry response packet 510 from the user's device 100 being detected by the access point 140A and the access point sending a time card message to the time card server 190. FIG. 3D shows the actual data content of the time card message 0001, as it is sent by the access point 140A to the time card server 190.

Figure 3F:
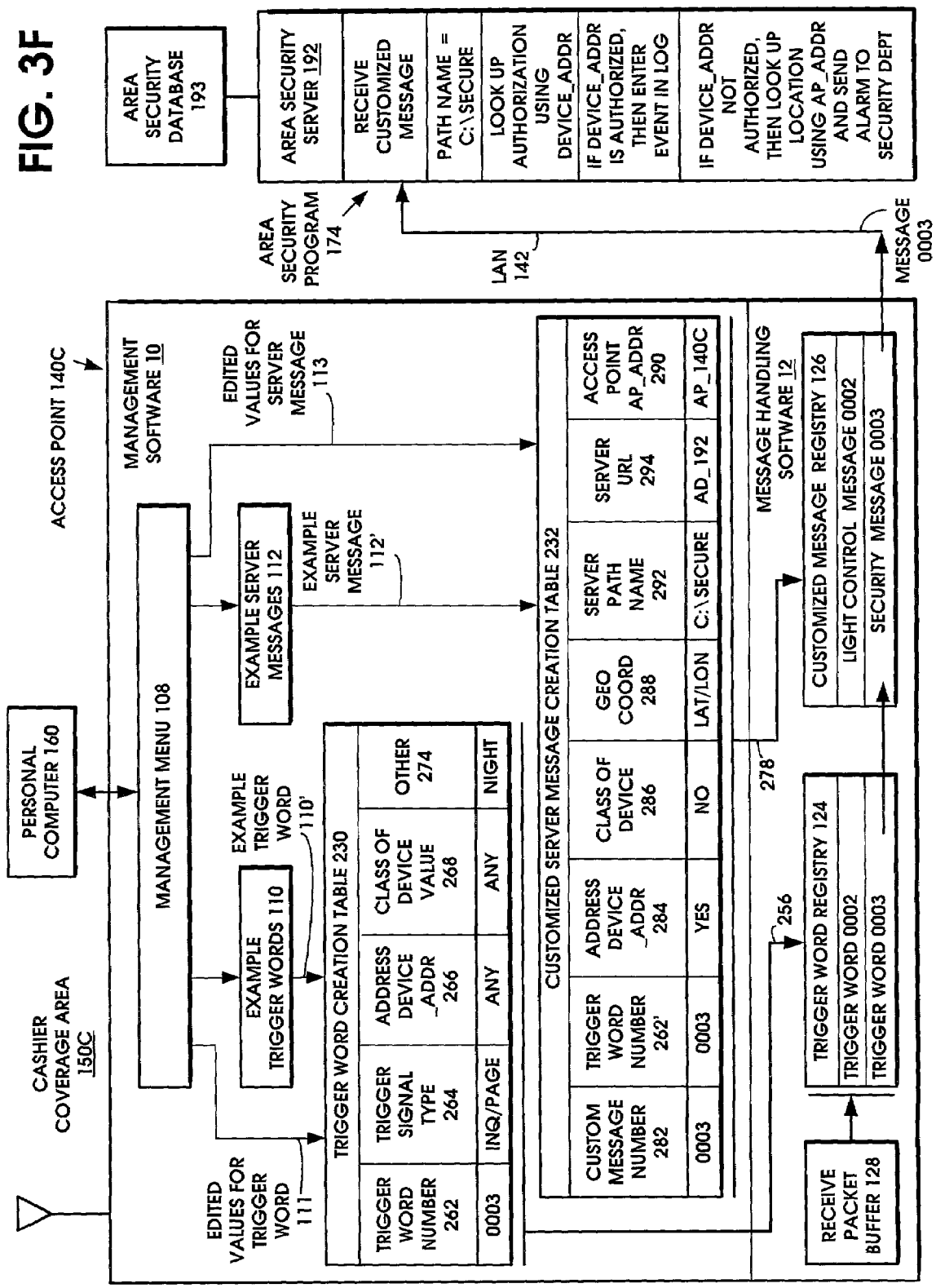
FIG. 3F is a functional block diagram of the access point 140C of FIG. 1B, illustrating the data flow for the creation of a trigger word and a customized server message for an area security application. When a wireless packet is received that satisfies the trigger word, the security message is sent from the access point to the area security program in the server 192.

FIG. 3F is a functional block diagram of the access point 140C of FIG. 1B, illustrating the dataflow for the creation of a trigger word in a customized server message for an area security application. When a wireless packet is received that satisfies the trigger word, the security message is sent from the access point to the area security program in server 192. The trigger word 0003 is created by the system administrator in the trigger word creation table 230, and the customized message number 0003 is created by the system administrator in the customized server message creation table 232. When the trigger word and the customized message are completed to the satisfaction of the system administrator, they are respectively loaded into the trigger word registry 124 and the customized message registry 126. In the message handling software 12, when a wireless packet is received from the wireless device 100 and loaded into the receive packet buffer 128, the values in the fields of the packet are compared with the corresponding values in the trigger words of the trigger word registry 124. If the trigger word 0003 is satisfied, then a signal is transferred to the customized message registry 126, to access and output the security message 0003 over the local area network 142 to the area security server 192. There, the area security program 174 is executed in response to receiving the customized message.

Figure 4:
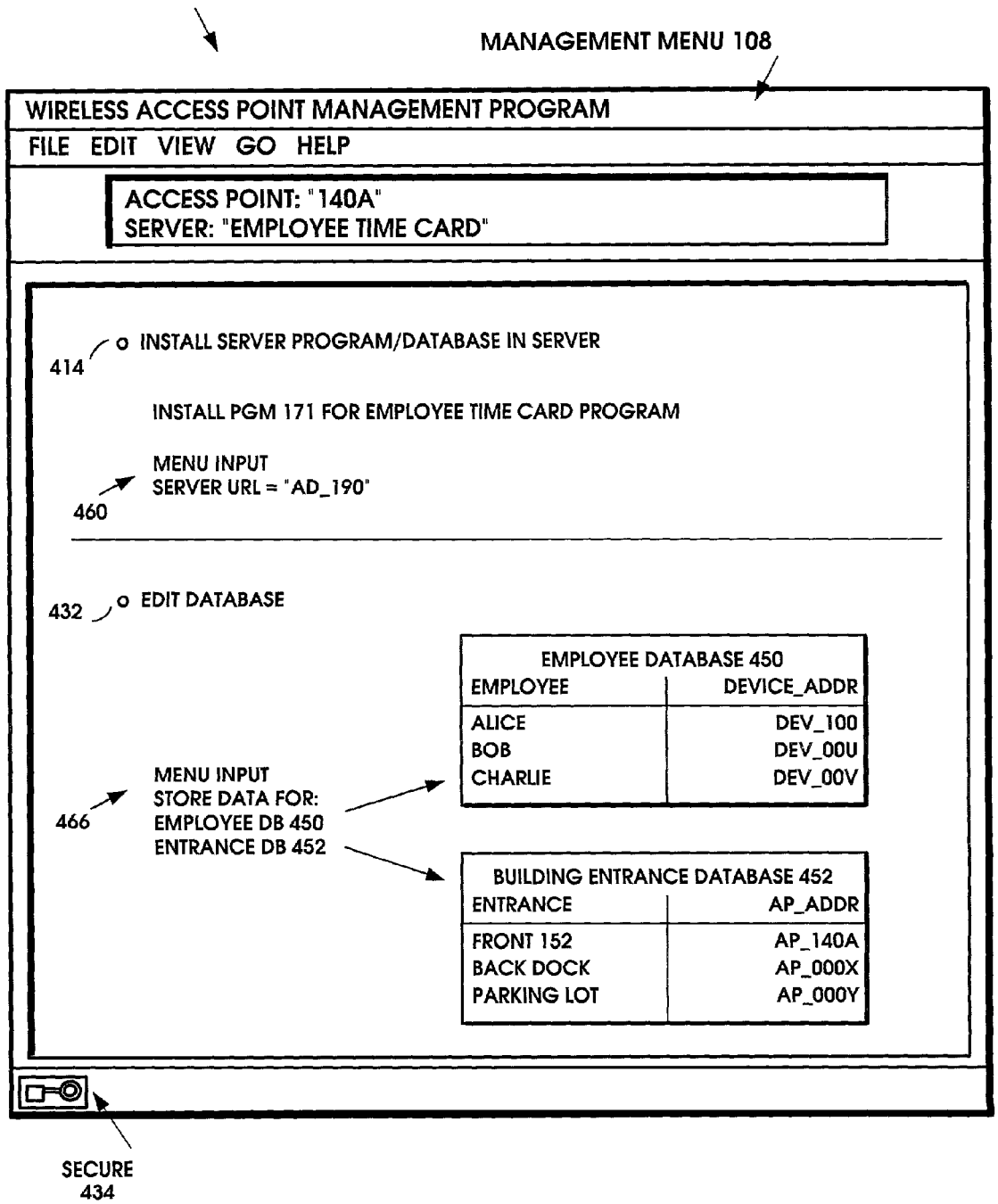
FIG. 4 illustrates the example appearance of the management menu 108 of the access point 140A, displayed on the personal computer 160 of FIG. 1B. The menu 108 is shown installing the time card program on the server 190 and editing the data stored in the database 191.
Figure 4B:
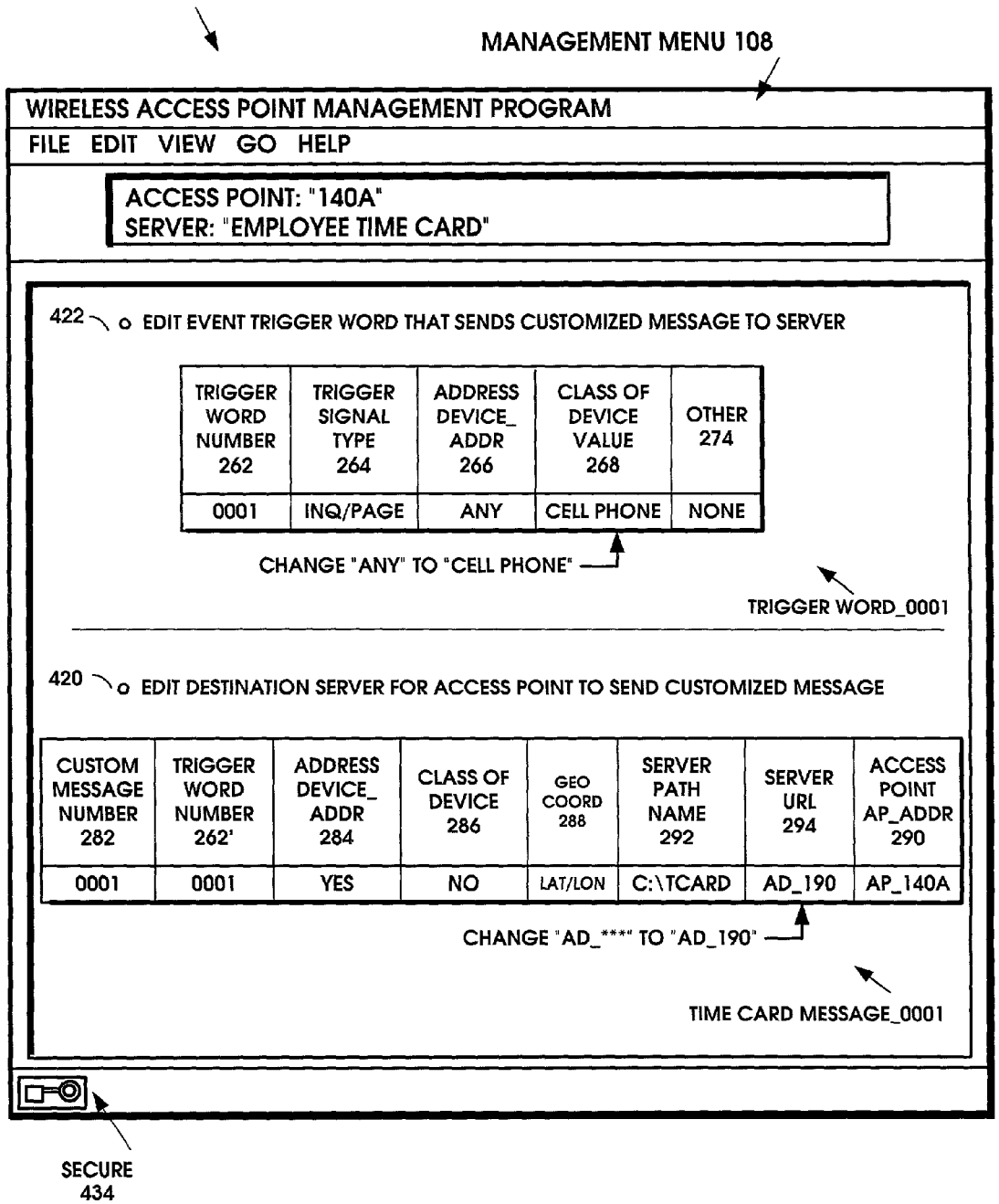
FIG. 4B illustrates the appearance of the management menu 108 of the access point 140A, displayed on the personal computer 160 of FIG. 1B. The menu 108 is shown editing a trigger word and editing a server message which will be stored in the access point 140A for the time card application.
Figure 4C:
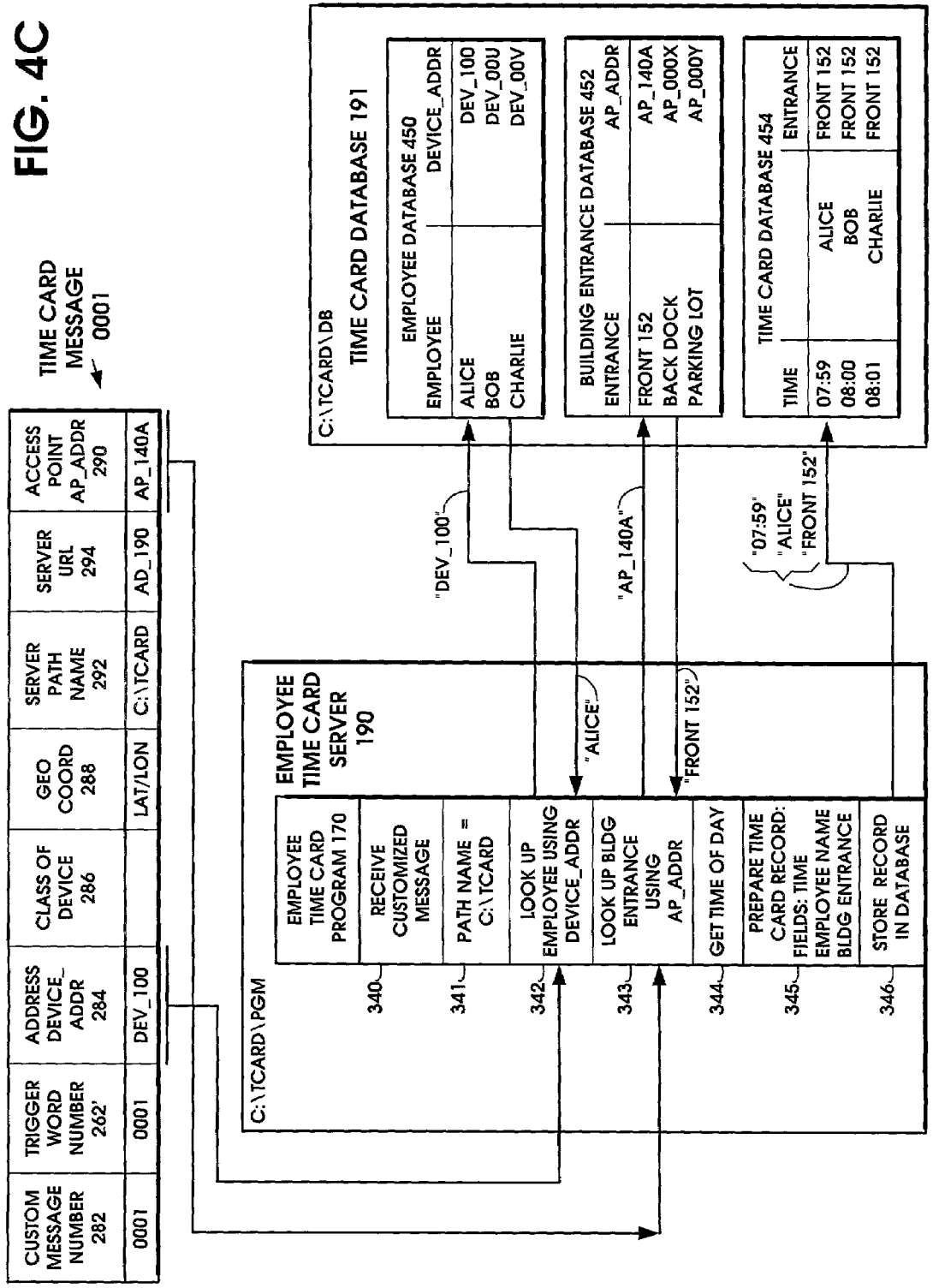
FIG. 4C is a data flow diagram illustrating the employee time card server program operating on the values of the variables provided by the time card message and manipulating the data in the time card database.

FIG. 4 illustrates the example appearance of the management menu 108 of the access point 140A, displayed on the personal computer 160 of FIG. 1B. Menu 108 is shown installing the time card program on the server 190 and editing the data stored in the database 191. The system administrator selects step 414 to install the server program and the database in the server. The message 460 is displayed on the menu showing the system administrator's input of the server URL which is AD-190. Then the system administrator makes the selection 432 to edit the database. Message 466 displayed in the menu shows the system administrator's input of data for the employee database 450 and the entrance database 452.

FIG. 4A is a dataflow diagram illustrating the installation program 171 for the employee time card program 170. The installation program is shown creating the database directory and the program directory in the server 190 for installation of the employee time card application. The installation program 171 is shown in FIG. 4A with steps 460 through 466. When the installation program is executed on the server 190, steps 460 through 466 install the employee time card program 170 and the time card database 191. Step 460 receives the menu input from the system administrator defining the server URL as AD-190. Step 461 creates the directory c:\tcard on the server. Step 462 creates the sub-directory c:\tcard\pgm. Step 463 stores the time card program 470 in the sub-directory. Then step 464 creates the sub-directory c:\tcard\db. Then step 465 creates sub-directories for the employee database 450, the entrance database 452, and the time card database 454. Then step 466 receives the menu input from the system administrator defining data to be stored for the employee database 450 and the entrance database 452. At the conclusion of the installation program 171, both the employee time card program 170 and the time card database 191 are installed on the server 190 and are ready for the receipt of customized messages from the access point 140A.

FIG. 4B illustrates the appearance of the user interface menu 108 of the access point 140A, displayed on the personal computer 160 of FIG. 1B. The menu 108 is shown editing a trigger word and editing a server message which will be stored in the access point 140A, for the time card application. The management menu 108 shows the selection step 422 to edit the event trigger word that sends the customized message to the server. FIG. 4B shows that the trigger word 0001 is being edited to change the field for class of device from "any" to "cell phone". Then selection 420 is made to edit the destination server for the access point to send the customized message. FIG. 4B shows the time card message 0001 having the server URL field 294 edited to change the generic address to the AD-190 address for the destination server.

FIG. 4C is a dataflow diagram illustrating the employee time card server program operating on the values of the variables provided by the time card message and manipulating the data in the time card database. FIG. 4C shows the time card message 0001 which has been received by the server 190. This initiates the execution of the employee time card program 170 which passes through steps 340 and 341 to step 342 which receives the device address from fields 284 of the time card message 0001 having a value of "dev-100". Step 342 looks up the employee in the database using the device address value of "dev-100", as shown in FIG. 4C. The employee name of "Alice" is returned from the employee database 450 to step 342 of the employee time card program 170. Program 170 then passes to step 343 which accepts the access point address from field 290 of the time card message 0001, the value of "ap-140*a*" is passed from the time card message 0001 to step 343 of the program 170, which looks up the building entrance in the database using the access point address. The value of "ap-140*a*" is passed to the time card database 191 where the building entrance database 452 is interrogated and the location "front 152" is passed back to step 343 of the program 170. Program 170 then continues to flow through steps 344 and 345 and 346 where a time card record is formulated with the fields of the time, the employee name and the building entrance, each being entered in the record as a respective time of day, employee name of "Alice" and the building entrance of "front 152". Then the resulting record is stored in the time card database 454.

FIG. 5A shows the Bluetooth packet structure for an inquiry packet 500 sent by a Bluetooth access point to the user's device 100. FIG. 5B shows the Bluetooth packet structure for an inquiry response packet sent by the user's device 100 back to the access point.

FIG. 5C shows a Bluetooth packet structure for a paging packet sent by the user's device 100 to the access point.

Figure 6:
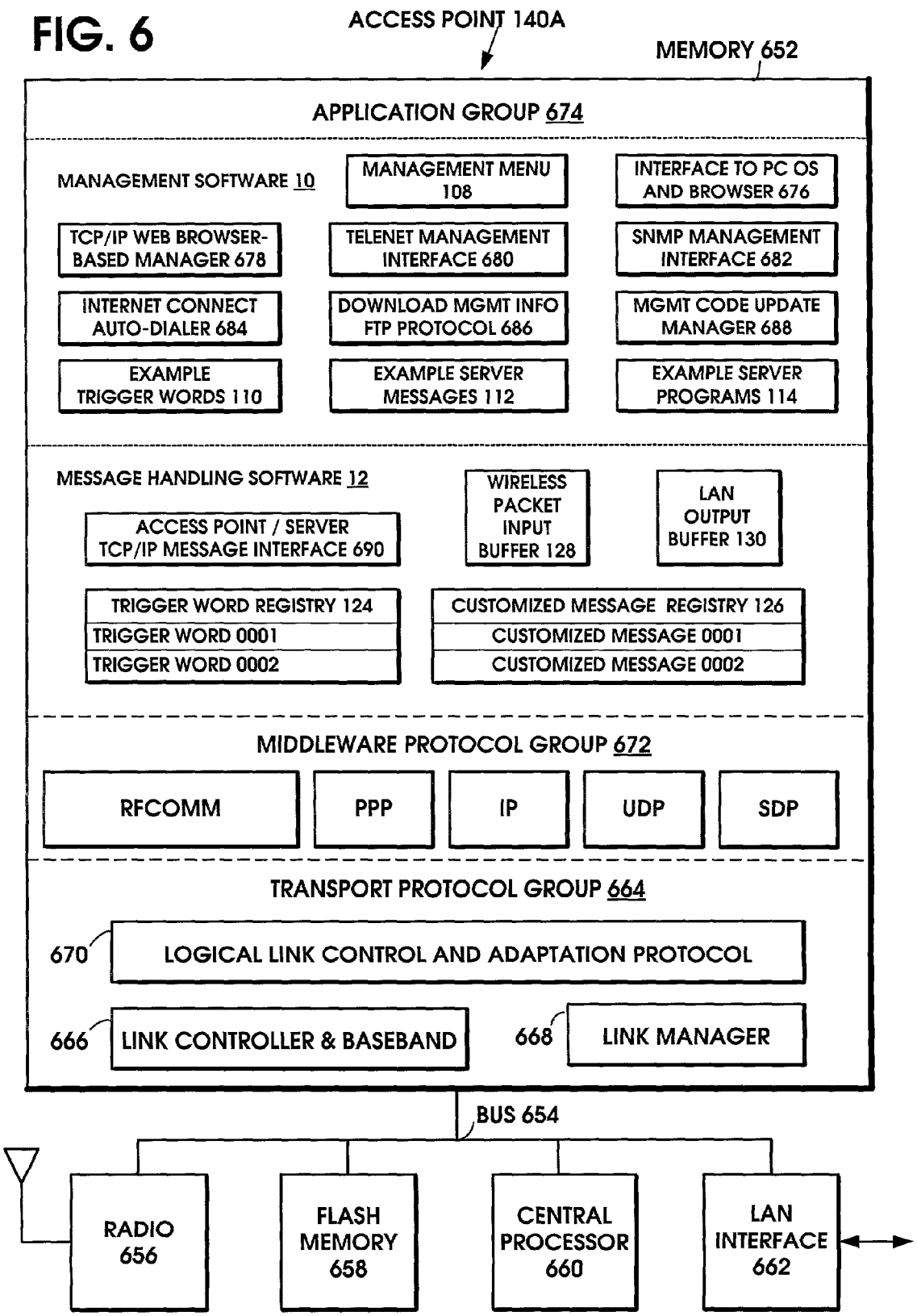
FIG. 6 is an architectural diagram of the access point 140A, according to one embodiment of the present invention, showing the hardware components and the contents of the memory.

FIG. 6 is an architectural diagram of the access point 140A, according to one embodiment of the present invention, showing the hardware components and contents of the memory 652. The memory 652 is connected by means of the bus 654 to the Bluetooth radio 656, the flash memory 658, central processor 660 and the local area network interface 662. Stored in the memory 652 is the transport protocol group 664 which includes the logical link control and adaptation protocol 670, the link controller and baseband 666 and the link manager 668. Also stored in the memory 652 is the middleware protocol group 672 which includes RFCOMM, the PPP, IP, UDP and SDP protocols. Also stored in the memory 652 is the application group 674 which includes the management software 10 and the message handling software 12.

The management software 10 of FIG. 6 includes the management menu 108, an interface to the personal computer operating system and browser 676, a TCP/IP web browser based manager 678, a Telenet management interface 680, an SNMP management interface 682, an Internet connect autodialer 684, a download management information FTP manager 686, a management code update manager 688, example trigger words 110, example server messages 112, and example server programs 114.

The message handling software 12 shown in FIG. 6 includes the access point to server TCP/IP message interface 690, the wireless packet input buffer 128, the LAN output buffer 130, the trigger word registry 124 and the customized message registry 126.

The following paragraphs discuss the application of the invention to the Bluetooth standard. In this example, the Bluetooth access point device 140 is connected over the landline network 142 and 144 to the service platform server 180, as shown in FIG. 1. The service platform server 180 has service offerings that it would like to make available to mobile Bluetooth devices 100 passing within the RF communications range of the Bluetooth access point device 140.

The Bluetooth access point device 140 periodically sends out Bluetooth inquiry packets 500 on the RF link to any mobile Bluetooth devices 100 within the RF communications range. FIG. 5A shows the Bluetooth packet structure for an inquiry packet 500 sent by a Bluetooth access point device to the user's device 100. The general inquiry access code (GIAC) of the packet 500 is recognized by all Bluetooth devices as an inquiry message. During the inquiry procedure, any other Bluetooth devices that are in the inquiry scan state, such as the user's device 100, are scanning for the receipt of inquiry packets 500. If the user's device 100 in the inquiry scan state receives the inquiry packet 500, it will respond with an inquiry response packet 510 that has sufficient information to enable the Bluetooth access point device to build its inquiry response table of essential information required to make a connection. Any Bluetooth device recognizing inquiry packet 500 can respond. FIG. 5B shows the Bluetooth frequency hop synchronization (FHS) packet structure for an inquiry response packet 510 sent by the user's device 100. The FHS packet structure for an inquiry response packet 510 sent by the user's device 100 includes the access code field 512, the header which includes the slave member number field 514 in which AM_ADDR is no yet assigned and is set to zero, the type field 516 and the parity field 518. Another the slave member number field 524 also has AM_ADDR set to zero. Field 522 contains the user's class-of-device (CoD) information. The FHS packet structure for an inquiry response packet 510, provides essential information about the user's device 100 that enables the Bluetooth access point device to the make a connection to the user's device: Field 520 contains the user's BD_ADDR and field 526 contains the user's current clock value. The Bluetooth access point device 140A uses the information provided in the inquiry response packet 510 it has received from the user's device 100 to match with a trigger word in the trigger word registry 124.

Since Bluetooth access point device 140A has initiated the inquiry, it will be the master device in the new piconet being formed by the two devices. The user's device 100 will become the slave to the Bluetooth access point device 140A.

Instead of the access point 140 sending out an inquiry packet 500 and receiving an inquiry response packet 510 from user's device 100 with the user device's address 520 and class of device 522 information, the user's device 100, itself, can initiate the connection. The user's device 100 can send out an inquiry packet 500 shown in FIG. 5A. The access point 140 will respond with an inquiry response packet, modified from that shown for packet 510 in FIG. 5B, by having the sender's address field 520 contain the access point's address and by having the sender's class of device field 522 contain the access point's CoD value. The access point 140 will then have to wait until the user's device 100 responds with a page packet similar to packet 530 of FIG. 5C, since the access point 140 will need the information in the page packet in order to match it with a trigger word in the trigger word registry 124. The user device's paging packet 530, will contain the user device's address in field 540 and class of device information in field

542. The user device's paging packet 530 received by the access point 140, will be buffered in the wireless packet input buffer 128 of FIG. 3C. There, its sender's address field 540 of FIG. 5C can be matched with address value 266 in the trigger word registry 124 of FIG. 3C. For example, the address of the device 100 in field 540 can be matched with address values 266 in the trigger word registry 124. Also, the class of device of the device 100 in field 542, can be compared with class of device values 268 stored in the trigger word registry 124. If there is a match, then the corresponding customized server message is accessed from the customized server message registry 126 and sent to the server 190 designated in field 294 of the customized server message.

The invention can also be applied to wireless local area networks employing the IEEE 802.11 Wireless LAN Standard or the HIPERLAN Standard.

The resulting invention solves the problem of facilitating the preparation of customized messaging between a wireless access point and a variety of service platforms.

Although a specific embodiment of the invention has been disclosed, it will be understood by those having skill in the art that changes can be made to that specific embodiment without departing from the spirit and the scope of the invention.

What is claimed is:

1. A method, comprising:
   providing a customized message in a wireless access point;
   providing a customized trigger word including a specification of an address of a wireless device to be detected, a specification of a type of the wireless device, and a specification of a time of day that must exist when an event is detected;
   enabling the access point to detect events specified by the customized trigger word, wherein the events include receiving a signal from a wireless device within a coverage area of the access point, the signal indicating a type of the wireless device and an address of a wireless device;
   using the customized trigger word to access the customized message; and
   using said trigger word to invoke sending the customized message to a content server, in response to said detected events occurring with a time of day that is the same as the time of day specified in the customized trigger word.

2. The method of claim 1, which further comprises:
   defining an event trigger word that initiates sending the customized message to the server.

3. The method of claim 1, which further comprises:
   defining a destination server for the access point to the send customized message.

4. The method of claim 1, which further comprises:
   defining geographic coordinates of the access point to send the customized message.

5. The method of claim 1, which further comprises:
   defining said customized message to include the mobile device's address and information to be added by the access point.

6. The method of claim 1, which further comprises:
   defining parameters for the customized message including geographic coordinates of the access point.

7. The method of claim 1, which further comprises:
   said access point and a wireless mobile device are Bluetooth devices.

8. The method of claim 1, which further comprises:
   said access point and a wireless mobile device are IEEE 802.11 wireless devices.

9. The method of claim 1, which further comprises:
   said access point and a wireless mobile device are HIPERLAN wireless devices.

10. A method, comprising:
    presenting an example message on a user interface coupled to a wireless access point;
    receiving an editing change to the example message from the user interface creating a customized message and storing the customized message in the access point;
    editing an example trigger word to create a customized trigger word including a specification of an address of a wireless device to be detected, a specification of a type of the wireless device, and a specification of a time of day that must exist when an event is detected;
    enabling the access point to detect events specified by the customized trigger word, wherein the events include receiving a signal from a wireless device within a coverage area of the access point, the signal indicating a type of the wireless device and an address of a wireless device;
    using the customized trigger word to access the customized message; and
    using said customized trigger word to invoke sending the customized message to a server, in response to said detected events occurring with a time of day that is the same as the time of day specified in the customized trigger word.

11. The method of claim 10, which further comprises:
    said access point and a wireless mobile device are Bluetooth devices.

12. The method of claim 10, which further comprises:
    said access point and a wireless mobile device are IEEE 802.11 wireless devices.

13. The method of claim 10, which further comprises:
    said access point and a wireless mobile device are HIPERLAN wireless devices.

14. A method, comprising:
    providing a customized message in a wireless access point;
    presenting an example trigger word on a user interface coupled to the wireless access point;
    receiving an editing change to the example trigger word from the user interface to create an edited trigger word including a specification of an address of a wireless device to be detected, a specification of a type of the wireless device, and a specification of a time of day that must exist when an event is detected, and storing the edited trigger word in the access point;
    enabling the access point to detect events specified by the edited trigger word, wherein the events include receiving a signal from a wireless device within a coverage area of the access point, the signal indicating a type of the wireless device and an address of a wireless device;
    using the edited trigger word to access the customized message; and
    using said edited trigger word to invoke sending the customized message to a server, in response to said detected events occurring with a time of day that is the same as the time of day specified in the edited trigger word.

15. The method of claim 14, which further comprises:
    said access point and a wireless mobile device are Bluetooth devices.

16. The method of claim 14, which further comprises:
    said access point and a wireless mobile device are IEEE 802.11 wireless devices.

17. The method of claim 14, which further comprises:
    said access point and a wireless mobile device are HIPERLAN wireless devices.

18. A method, comprising:

editing an example message to create a customized message and editing an example trigger word to create a customized trigger word at an access point, to enable the access point to detect events specified by the customized trigger word, the customized trigger word including a specification of an address of a wireless device to be detected a specification of a type of the wireless device, and a specification of a time of day that must exist when an event is detected;

receiving a packet from a mobile wireless device indicating a type of the wireless device and an address of the wireless device;

using information in the received packet as stimuli to be matched with said customized trigger word; and determining a match when a time of day in receiving the packet is the same as the time of day specified in the customized trigger word and in response, using said trigger word to invoke sending the customized message to a server.

19. The method of claim 18, which further comprises:

said customized message being edited in the access point.

20. The method of claim 19, which further comprises:

said customized message including the mobile device's address and geographic coordinates of the access point.

21. The method of claim 20, which further comprises:

said server using the information in the customized message to access content information.

22. The method of claim 18, which further comprises:

said access point and said wireless mobile device are Bluetooth devices.

23. The method of claim 18, which further comprises:

said access point and said wireless mobile device are IEEE 802.11 wireless devices.

24. The method of claim 18, which further comprises:

said access point and said wireless mobile device are HIPERLAN wireless devices.

25. A system, comprising:

a user interface coupled to an access point, configured to provide a customized message and providing a customized trigger word for storage in the access point, to enable the access point to detect events specified by the customized trigger word, the customized trigger word including a specification of an address of a wireless device to be detected, a specification of a type of the wireless device, and a specification of a time of day that must exist when an event is detected;

a radio in the access point configured to receive a packet from a mobile wireless device, indicating a type of the wireless device and an address of the wireless device;

a processor in the access point configured to match information in the received packet with said customized trigger word; and said processor determining a match when a time of day in receiving the packet is the same as the time of day specified in the customized trigger word and in response, using said trigger word to invoke sending the customized message to a server.

26. The system of claim 25, which further comprises:

said access point and said wireless mobile device are Bluetooth devices.

27. The system of claim 25, which further comprises:

said access point and said wireless mobile device are IEEE 802.11 wireless devices.

28. The system of claim 25, which further comprises:

said access point and said wireless mobile device are HIPERLAN wireless devices.

29. A computer program, comprising:

a computer readable medium;

program code in said computer readable medium for editing an example message to create a customized message and editing an example trigger word to create a customized trigger word at an access point, to enable the access point to detect events specified by the customized trigger word, the customized trigger word including a specification of an address of a wireless device to be detected, a specification of a type of the wireless device, and a specification of a time of day that must exist when an event is detected;

program code in said computer readable medium for receiving a packet from a mobile wireless device, indicating a type of the wireless device and an address of the wireless device;

program code in said computer readable medium for using information in the received packet as stimuli to be matched with said customized trigger word; and program code in said computer readable medium for determining a match when a time of day in receiving the packet is the same as the time of day specified in the customized trigger word and in response, using said customized trigger word to invoke sending the customized message to a server.

30. The computer program product of claim 29, which further comprises:

said access point and said wireless mobile device are Bluetooth devices.

31. The computer program product of claim 29, which further comprises:

said access point and said wireless mobile device are IEEE 802.11 wireless devices.

32. The computer program product of claim 29, which further comprises:

said access point and said wireless mobile device are HIPERLAN wireless devices.

33. A method, comprising:

providing a customized message in a wireless access point;

providing a customized trigger word including a specification of an address of a wireless terminal to be detected, a specification of a type of the wireless terminal, and a specification of a time of day to detect the wireless terminal;

detecting events specified by the trigger word at the access point, wherein the events include receiving a signal from a wireless terminal within a coverage area of the access point, the signal indicating a type of the wireless terminal and an address of a wireless terminal;

determining that the time of day specified in the trigger word is the same as the time of day that the wireless terminal is detected;

using the customized trigger word to access the customized message; and using said trigger word to invoke sending the customized message to a content server, in response to said detected events.

34. The method of claim 33, wherein said type indication is a class of device indication of the wireless terminal.

35. The method of claim 33, which further comprises:

accessing a time-of-day value in response to the customized message; and performing a programmed operation based on said events and time-of-day.

36. A system, comprising:
a user interface coupled to an access point, configured to prepare a customized message and a trigger word for storage in the access point, to enable the access point to detect events specified by the trigger word, the trigger word including a specification of an address of a wireless terminal to be detected, a specification of a type of the wireless terminal, and a specification of a time of day to detect the wireless terminal wherein the events include receiving a signal from a wireless terminal within a coverage area of the access point, the signal indicating a type of the wireless terminal and an address of the wireless terminal;
a radio in the access point configured to receive a packet including said type indication and address from a mobile wireless terminal;
a processor in the access point configured to match said type indication and said address in the received packet with said trigger word;
said processor determining that the time of day specified in the trigger word is the same as the time of day that the wireless terminal is detected; and
said processor determining a match and in response, using said trigger word to invoke sending the customized message to a server.

37. The system of claim 36, wherein said type indication is a class of device indication of the wireless terminal.

38. An apparatus, comprising:
an input configured to provide a customized message in a wireless access point;
said input further configured to provide a customized trigger word including a specification of an address of a wireless device to be detected a specification of a type of the wireless device, and a specification of a time of day that must exist when an event is detected;
a processor configured to enable the access point to detect events specified by the customized trigger word, wherein the events include receiving a signal from a wireless device within a coverage area of the access point, the signal indicating a type of the wireless device and an address of a wireless device;
said processor further configured to use the customized trigger word to access the customized message; and
said processor further configured to use said trigger word to invoke sending the customized message to a content server, in response to said detected events occurring with a time of day that is the same as the time of day specified in the customized trigger word.

39. An apparatus, comprising:
a user interface coupled to a wireless access point, configured to present an example message;
a processor configured to receive an editing change to the example message from the user interface creating a customized message and storing the customized message in the access point;
said processor further configured to edit an example trigger word to create a customized trigger word including a specification of an address of a wireless device to be detected, a specification of a type of the wireless device, and a specification of a time of day that must exist when an event is detected;
said processor further configured to enable the access point to detect events specified by the customized trigger word, wherein the events include receiving a signal from a wireless device within a coverage area of the access point, the signal indicating a type of the wireless device and an address of a wireless device;
said processor further configured to use the customized trigger word to access the customized message; and
said processor further configured to use said customized trigger word to invoke sending the customized message to a server, in response to said detected events occurring with a time of day that is the same as the time of day specified in the customized trigger word.

40. A method, comprising:
an input configured to provide a customized message in a wireless access point;
a user interface coupled to the wireless access point, configured to present an example trigger word;
a processor configured to receive an editing change to the example trigger word from the user interface to create an edited trigger word including a specification of an address of a wireless device to be detected, a specification of a type of the wireless device, and a specification of a time of day that must exist when an event is detected, and storing the edited trigger word in the access point;
said processor further configured to enable the access point to detect events specified by the edited trigger word, wherein the events include receiving a signal from a wireless device within a coverage area of the access point, the signal indicating a type of the wireless device and an address of a wireless device;
said processor further configured to use the edited trigger word to access the customized message; and
said processor further configured to use said edited trigger word to invoke sending the customized message to a server, in response to said detected events occurring with a time of day that is the same as the time of day specified in the edited trigger word.

41. An apparatus, comprising:
a processor configured to edit an example message to create a customized message and edit an example trigger word to create a customized trigger word at an access point, to enable the access point to detect events specified by the customized trigger word, the customized trigger word including a specification of an address of a wireless device to be detected, a specification of a type of the wireless device, and a specification of a time of day that must exist when an event is detected;
an input configured to receive a packet from a mobile wireless device, indicating a type of the wireless device and an address of the wireless device;
said processor further configured to use information in the received packet as stimuli to be matched with said customized trigger word; and
said processor further configured to determine a match when a time of day in receiving the packet is the same as the time of day specified in the customized trigger word and in response, and use said trigger word to invoke sending the customized message to a server.

42. An apparatus, comprising:
an input configured to provide a customized message in a wireless access point;
said input further configured to provide a customized trigger word including a specification of an address of a wireless terminal to be detected, a specification of a type of the wireless terminal, and a specification of a time of day to detect the wireless terminal;
a processor configured to detect events specified by the trigger word at the access point, wherein the events include receiving a signal from a wireless terminal within a coverage area of the access point, the signal indicating a type of the wireless terminal and an address of a wireless terminal;

said processor further configured to determine that the time of day specified in the trigger word is the same as the time of day that the wireless terminal is detected;

said processor further configured to use the customized trigger word to access the customized message; and said processor further configured to use said trigger word to invoke sending the customized message to a content server, in response to said detected events.

* * * * *